(12) United States Patent
Barnhill, Jr. et al.

(10) Patent No.: US 8,473,325 B2
(45) Date of Patent: Jun. 25, 2013

(54) SYSTEM AND METHOD FOR AUTOMATIC CONFIGURATION AND MANAGEMENT OF HOME NETWORK DEVICES USING A HIERARCHICAL INDEX MODEL

(75) Inventors: John A. Barnhill, Jr., San Francisco, CA (US); Alan Drew Banks, San Francisco, CA (US)

(73) Assignee: Pie Digital, Inc., Palo Alto, CA (US)

( * ) Notice: Subject to any disclaimer, the term of this patent is extended or adjusted under 35 U.S.C. 154(b) by 329 days.

(21) Appl. No.: 12/758,755

(22) Filed: Apr. 12, 2010

(65) Prior Publication Data

US 2010/0262467 A1 Oct. 14, 2010

Related U.S. Application Data

(63) Continuation-in-part of application No. 12/251,412, filed on Oct. 14, 2008.

(60) Provisional application No. 60/998,820, filed on Oct. 12, 2007.

(51) Int. Cl.
*G06Q 10/00* (2012.01)

(52) U.S. Cl.
USPC .......................................... 705/7.29; 715/733

(58) Field of Classification Search
USPC .............. 705/7.11–7.42; 710/11–12; 715/733
See application file for complete search history.

(56) References Cited

U.S. PATENT DOCUMENTS

| | | | | |
|---|---|---|---|---|
| 5,655,148 A * | 8/1997 | Richman et al. | ................... | 710/8 |
| 6,198,479 B1 * | 3/2001 | Humpleman et al. | ........ | 715/733 |
| 6,756,998 B1 * | 6/2004 | Bilger | ........................... | 715/764 |
| 6,792,319 B1 * | 9/2004 | Bilger | ............................. | 700/13 |
| 6,909,921 B1 * | 6/2005 | Bilger | ............................. | 700/19 |
| 6,912,429 B1 * | 6/2005 | Bilger | ............................. | 700/19 |
| 7,515,546 B2 * | 4/2009 | Gaspard et al. | ................ | 370/252 |
| 2006/0123080 A1 * | 6/2006 | Baudino et al. | ............... | 709/204 |
| 2006/0133392 A1 * | 6/2006 | Ajitomi et al. | ................ | 370/401 |
| 2006/0187858 A1 * | 8/2006 | Kenichi et al. | ................ | 370/254 |
| 2007/0192486 A1 * | 8/2007 | Wilson et al. | ................. | 709/225 |
| 2007/0201384 A1 * | 8/2007 | Cunningham et al. | ........ | 370/254 |

OTHER PUBLICATIONS

Chuang, Tamara, "Coming Soon," The Orange County Register, Sep. 21, 2005.
Bernhill, John, "Pie 6 Minute Presentation Script" Sep. 15, 2005 Script of live stage presentation given at Demofall 2005 Conference held on Sep. 21, 2005 in Orange County, California.
Pie, "Now Home Networking is Easy as Pie" 2005 Product Date Sheet distributed at Demofall 2005 Conference held on Sep. 21, 2005 in Orange County, California.

* cited by examiner

*Primary Examiner* — Romain Jeanty
*Assistant Examiner* — Alan S Miller
(74) *Attorney, Agent, or Firm* — Patterson & Sheridan LLP

(57) ABSTRACT

A system for automatically installing and managing devices in a home network implements automated configuration and maintenance of devices and peripherals. A service platform facilitates automated discovery and deployment of home networks and devices that interact with the network. The system includes a monitoring and learning processes for automatic issue detection and alerting. Activity of users and devices within the home are monitored, usage patterns are learned and applied back to the system to improve the digital performance of the home. This system leverages data center, service node, and agent software in the devices to access a knowledge base storing data regarding home entities. A hierarchical index model is used to assign intelligence levels to these entities based on certain parameters. The indices are used to direct alert messages, take an action, and implement a targeted facility for providing communications from network managers or service providers.

23 Claims, 21 Drawing Sheets

400

| | FILES | SERVICES | PRINTERS | OTHER DEVICES |
|---|---|---|---|---|
| USER W/ PASSWORD | Open, custom hidden/protected folders | Open, custom settings (parental controls) | Open, custom printer settings | Open, custom based on device class |
| USER W/O PASSWORD | Open | Open | Open | Open |
| GUEST | Limited, guest folder | None | Open, time limit | None |

| | MANAGED DEVICE | UNMANAGED DEVICE | UNKNOWN DEVICE |
|---|---|---|---|
| CONNECTED TO USB | Find device information; device known and manageable | Tell user device known but unmanaged | Tell user device unknown and unmanaged |
| CONNECTED TO ENET | Install, apply policy levels, allow user configuration | Install, tutorial on further setup | Allow internet/network access |
| CONNECTED TO WIRELESS | Install, apply policy levels, allow user configuration | Install, tutorial on further setup | Tutorial based on device (limited, generic) |

| LEVEL | ITEM | STATUS | CLASS | DATE |
|---|---|---|---|---|
| RED | ROUTER | DISCONNECTED | DEVICE | 6/4/08 |
| YELLOW | HOME NOTEBOOK | DISK ERRORS | DEVICE | 6/1/08 |
| YELLOW | ANTI-VIRUS | OUT-OF-DATE | SERVICE | 5/15/08 |
| YELLOW | ROUTER | BANDWIDTH MISMATCH | NETWORK | 4/3/08 |

1002

Possible Resolutions:
    Check Ethernet
    Check Power
    Reboot Router (click to execute)
    Replace Router

| OPERATING SYSTEM | Windows XP | SP-3 Up to date | GREEN |
|---|---|---|---|
| SECURITY | Anti-Virus Firewall Spyware | Desktop - OOD Enabled Enabled | YELLOW GREEN GREEN |
| APPLICATIONS | Applications (12) | Enabled Up to Date | GREEN |
| SHARING | PCs (2) | Sharing Enabled | GREEN |
| QoS | Applications (4) | Default Prioritization | GREEN |
| UTILITIES | Utilities (14) | Installed Up to date | GREEN |

| | ACTION ITEMS | | | |
|---|---|---|---|---|
| Level | Item | Status | Class | Date |
| *color* | Laura's Laptop | Disk Errors | Device | 06/01/08 |
| Possible Resolutions:<br>• Disk Utility: Backup<br>• Disk Utility: chkdsk<br>• On Site: Recover Data<br>• On Site: Replace Drive<br>• | | | | |
| *color* | Bandwidth | Not full speed | Network | 04/15/08 |

| Device Information 1302 | | Smith Home Information 1304 | |
|---|---|---|---|
| User Name: Laura | EDIT | Pie Serial Number: A03-11256 | |
| Computer Name: Laura's Laptop | EDIT | Modem: Linksys N-Router WRT150N | |
| Administrator Name: Laura | EDIT | Wireless Network Name: Smith Home | |
| Configured Users: 1 | | Guest Password: | EDIT |
| IP Address: 192.168.123.4 | | Security Key Nickname: easyaspie | EDIT |
| Domain: | | Technical Security Key Name: WPA2 | EDIT |
| Workgroup: | | DSL Provider (ISP): SBC Pacbell | |
| MAC Address: 00:0f:b5:39:44:ab | | SBC Yahoo Member ID: lsmith@sbcglobal.com | |
| Windows Version: XP Home Service Pack 2 | | SBC Yahoo Password: 123smith | EDIT |
| Current HW Profile: Default | | | PRINT |
| Printer: HP Officejet Pro K5400 (via USB) | | | |
| Computer OEM: Toshiba | | | |
| CPU Speed: Stepping Monitor | | | |
| Number of CPUs: 1 | | | |
| CPU Type: Intel Pentium M 2.00G | | | |
| | PRINT | | |

FIG. 13

| Entity Type | Class | Index Value | | | |
|---|---|---|---|---|---|
| HOUSEHOLD | Networking | 1 | 2 | ... | 8 |
| | Productivity | 1 | 2 | ... | 8 |
| | Entertainment | 1 | 2 | ... | 8 |
| USER | Networking | 1 | 2 | ... | 8 |
| | Productivity | 1 | 2 | ... | 8 |
| | Entertainment | 1 | 2 | ... | 8 |
| DEVICE | Networking | 1 | 2 | ... | 8 |
| | Productivity | 1 | 2 | ... | 8 |
| | Entertainment | 1 | 2 | ... | 8 |
| APPLICATION | Networking | 1 | 2 | ... | 8 |
| | Productivity | 1 | 2 | ... | 8 |
| | Entertainment | 1 | 2 | ... | 8 |
| COMMUNITY | Networking | 1 | 2 | ... | 8 |
| | Productivity | 1 | 2 | ... | 8 |
| | Entertainment | 1 | 2 | ... | 8 |

FIG. 14

| HIERARCHY OF DIGITAL HOME NETWORKING NEEDS ||
|---|---|
| SURVIVAL ||
| Physical | Basic Infrastructure. Necessary productivity devices are properly connected (computer, printer, drives, etc.) |
| Safety | Reliability and Security. Security is probably installed. Digital home is stable, reliable with infrequent outages. |
| SOCIAL ||
| Social | Communication and Sharing. Home network meets communication and interactions needs of family with each other and others within their digital social and familial network. Second computer hooked in; usage-appropriate and stable Internet service and telephonic infrastructure. |
| Esteem | Self-Determination. Feeling of control for Digital Home owner. S/he believes that s/he understands and controls the home network, having the ability to easily hook things into it without fear of a technology back hole. |
| Cognitive | Data Integration. Network simplifies media transfer between network capable devices (e.g. Outlook contact DB-> cell phone, digital imagery) |
| SELF-ACTUALIZATION ||
| Aesthetic | Entertainment Integration. Network facilitates integration of entertainment, computing, and gaming environments. Complexity dissipates through ease usability and perceived reliability. |
| Self-Actualization | Media Integration. Network enables seamless integration of media, cultural shift toward true integrated media usage. This results in new applied uses of the integrated technology in the digital home – tapping individual product features before not considered, now combined/integrated, deliver greater value to the consumer. |
| Transcendence | Holistic Digital Home Integration. Smart house concepts - standard home networking within building and appliance codes. |

FIG. 15A

| HIERARCHY OF DIGITAL PRODUCTIVITY NEEDS ||
|---|---|
| SURVIVAL ||
| Physical | Basic Infrastructure. Necessary productivity devices and applications are acquired and properly installed |
| Safety | Understanding and Reliability. Devices and productivity software are understood and able to be used without negatively impacting network stability or productivity |
| SOCIAL ||
| Social | Sharing. Communication devices, applications and data sharing technologies are understood and can be used effectively to meet the interactions needs of family with each other and others within their digital social and familial network. Cell Phone, Email, IM, Voice over IP, Internet communication technologies: discussion groups, chat, blogging, file sharing, calendar sharing, etc. |
| Esteem | Self-Determination. Feeling of control with regard to productivity devices and tools. S/he believes that s/he understands and controls communications, having the ability to use devices and tools to work and communicate effectively. |
| Cognitive | Understanding and sophistication of devices, sw and technologies that enable learning and analysis. Data aggregation and analysis SW (Excel, PowerPoint, Quickbooks, etc.), search engines, reference sites. |
| SELF-ACTUALIZATION ||
| Aesthetic | Mastery over the aesthetics of productivity environment. Ability to control colors and backgrounds of computing environment, play music, organize desktop. Layout design and control within productivity apps such as MS Word, Excel, PowerPoint. |
| Self-Actualization | Ability to use productivity environment for aspirational objectives. Mastery of productivity apps as a marketable skill set. Use of productive apps to achieve personal goals (e.g., Ebay, Etrade) Ability to use search apps to explore and grow. |
| Transcendence | Ability to cull a virtual community and influence others. Developing a digital productivity identity, i.e. advisor, guru—through with web development and group communications technologies. Blogging, Wiki, etc. |

FIG. 15B

| HIERARCHY OF DIGITAL ENTERTAINMENT NEEDS | |
|---|---|
| SURVIVAL | |
| Physical | Basic Infrastructure. Necessary entertainment devices and applications are acquired and properly installed |
| Safety | Understanding and Reliability. Devices and entertainment software are understood and able to be used without negatively impacting network stability, productivity environment, or entertainment environment |
| SOCIAL | |
| Social | Sharing. Entertainment devices, sites, media, and software are understood and can be used effectively to meet the interactions needs of the household (family) with each other and others within their digital social and familial network: Music and photo sharing, network gaming, downloading, sharing play lists, posting photo albums, etc. |
| Esteem | Self-Determination. Feeling of control with regards to entertainment devices and tools. Distinctions of format and playback capability (interactivity) of and between entertainment devices in the household. S/he believes that s/he understands and controls digital entertainment, having the ability to use devices and tools to discover and participate in entertainment options. |
| Cognitive | Access to media that catalyze learning and analysis. Understanding and sophistication of devices, software and technologies to that enable consumption of/interoperability with said media. Advancing within applications like iTunes; building complex play lists, and/or compression schemes, or library management |
| SELF-ACTUALIZATION | |
| Aesthetic | Mastery over the aesthetics of entertainment environment. Ability to control play music effectively, organize desktop. Construct networked media distribution paradigms (sharing) for their own aesthetic. Layout design and control within entertainment apps such as Photoshop, WinAmp, Pro Tools. |
| Self-Actualization | Ability to use entertainment environment for aspirational objectives. Mastery of entertainment apps as a marketable skill set. Use of entertainment apps to achieve personal goals (digital music apps, digital film apps, publishing) Ability to use entertainment apps to explore creativity and grow. |
| Transcendence | Ability to cull a virtual audience and entertain others. Developing a digital entertainment identity. |

FIG. 15C

SYSTEM AND METHOD FOR AUTOMATIC CONFIGURATION AND MANAGEMENT OF HOME NETWORK DEVICES USING A HIERARCHICAL INDEX MODEL

CROSS-REFERENCE TO RELATED APPLICATIONS

This application is a Continuation-in-Part Application of U.S. patent application Ser. No. 12/251,412, entitled "System and Method for Automatic Configuration and Management of Home Network Devices," filed Oct. 14, 2008, which itself claims priority from U.S. Provisional Patent Application No. 60/998,820, entitled "Distributed System and Method for Facilitated Automatic Configuration, Maintenance, and Diagnostics of a Local Area Network that in Parallel Provides for the Interoperability of Connected Intelligent Independent Computing Devices using Physical Layer, network Layer and Application Layer Programmatic Interfaces," filed Oct. 12, 2007, both applications of which are incorporated by reference in its entirety herein.

TECHNICAL FIELD

Embodiments relate generally to electronic consumer devices, and more specifically to facilitating the automatic installation and management of devices in a home network environment.

BACKGROUND

Home networks have evolved from residential local area networks for connecting computers and associated devices, such as printers and displays, to comprehensive systems that interconnect many types of electronic consumer devices that can be centrally managed. Many different devices, produced by different vendors and utilizing different resources and service requirements are being developed for use in home networks. With each device, there are usually large numbers of parameters that must be properly set to ensure compatibility and functionality within the network. At present, configuration management for home networks typically entails a high degree of user interaction with the applications and device, and a potentially high level of interaction with service providers, application vendors, or other third party content providers. This is often a time consuming and frustrating process for homeowners and installation personnel.

Home networking technology has essentially been synthesized down from business enterprise networking technology where companies have information technology (IT) teams to manage, maintain, and trouble shoot problems with their networks. Home networks are typically difficult to set-up for the average mass-market consumer, and when something goes wrong, or there are problems with a device connected to a home network, the consumer does not know where or how to diagnose or knowledgably repair the problem, causing significant frustration and potentially lost use of their network and/or connected device. As such, in contrast to a business, when a device is to be connected or set-up or problems arise with home networks, the consumer must either learn the management processes themselves, or seek other trained third-party information technology specialist to help.

One of the drivers for a consumer purchase of a home network is an interest/need for having and/or sharing a high-speed (broadband) Internet connection. The businesses that provide these connections (commonly known as Internet Service Providers or ISP) to consumer households must manage their own infrastructure technology to deliver the expected service to the home. Consequently, the technology for device management is often deployed within the networks of ISPs to provision and deliver the service to a connection point/gateway device in the home. Installation requires the consumer or a third-party to connect either a network-enabled personal computer or separate home networking device(s) to that connection point/gateway in order to access and make use of the Internet services within the home. The device management system enables the ISP to manage and control their network devices to the gateway, but the system lacks the ability to manage the various network capable devices beyond the gateway point that may be used and connected throughout the consumer's home network. When problems arise with a home network, the consumer most often contacts the ISP to help them identify and solve the problem. Because the ISPs device management technology cannot manage the devices other than their gateway device, problem resolution is manually managed with the consumer, and is often done by trial-by-error. This process is costly to the ISP and frustrating to the consumer.

Third-party IT service companies have increasingly been providing network management services for enterprises, and these markets have expanded to provide similar services to consumer households to support home networks and connected devices. However, service to home networks by third-parties is typically only done when the consumer requests service to repair a problem/episode when identified by the consumer, and typically requires a technician to be on-site at the home or remotely provide the service. For managing their services, some of these service companies have deployed limited information systems to store details about services they provide to a consumer that is collected manually by the technician when he is at the consumer home. Most present systems do not maintain information about the specific configuration or state of the home network that is being serviced, or about the other home devices that may be similarly configured. Manufacturers of home networking focused devices and services may attempt to apply technology to facilitate the transparent and automated set-up of consumer networking devices and implement efficient service models for their products. At best, however, the manufacturers and service providers can only provide an isolated view of only an individual product.

Certain systems have been developed for personal computers (PC) that provide utilities for a home networking and management, and run on a standard operating system (e.g., Windows XP or Vista) to provide notifications of basic home network problems as they arise and suggest self-directed fixes to the end-user. However, these systems require the consumer to install the software on each PC on the home network (assuming the each target PC is in good operating order). Such applications do not work on devices other than PCs, and require that the consumer understands the basic principals of home networking, as well the configuration parameters of the network connected devices. Most consumers do not have this understanding, and for those that do, network setup and maintenance is often a very tedious and time consuming process. Moreover, these applications can typically only recognize and address problems on an individual device-by-device basis, and are thus limited in scalability.

Within a particular household, there are typically a wide range of users, devices, and applications that are in use for various different purposes. Certain parameters regarding usage and external information can be used to facilitate the management and control of the home network. Present home network and home network management systems do not offer efficient means for usage information to be transmitted to manufacturers and managers, nor do they facilitate the creation and transmission of directed content and services to home network users. Manufacturers and service providers typically contact users based on scheduled notices or in response to specific user queries or complaints. Such contact and communication is usually not based on any sort of intelligence that is generated within the network itself.

What is needed, therefore, is a system that assesses and uses customer behavior, usage, and market information to allow service providers to direct communication and services to the customer in a manner that is driven and adapted to actual user needs and status.

BRIEF DESCRIPTION OF THE DRAWINGS

Embodiments of the present invention are illustrated by way of example and not limitation in the figures of the accompanying drawings, in which like references indicate similar elements and in which:

FIG. 4 is a table that illustrates an example of user privilege restrictions for use with a managed computer system, under an embodiment.

FIG. 7 is a table that illustrates actions associated with addition of a new device in a managed home network, under an embodiment.

FIG. 10 illustrates an example web page for a device view of the home network management user interface, under an embodiment.

FIG. 11 illustrates an example web page for a services view of the home network management user interface, under an embodiment.

FIG. 12 illustrates an example of an action item display area, under an embodiment.

FIG. 13 is an example of a client computer interface screen to the service node system, under an embodiment.

FIG. 14 is a table that lists profile indices for user types and classes within a managed digital home, under an embodiment.

FIG. 15A illustrates the mapping of Maslow's hierarchy levels to home networking needs, under an embodiment.

FIG. 15B illustrates the mapping of Maslow's hierarchy levels to digital productivity needs, under an embodiment.

FIG. 15C illustrates the mapping of Maslow's hierarchy levels to digital entertainment needs, under an embodiment.

SUMMARY

Figure 1:
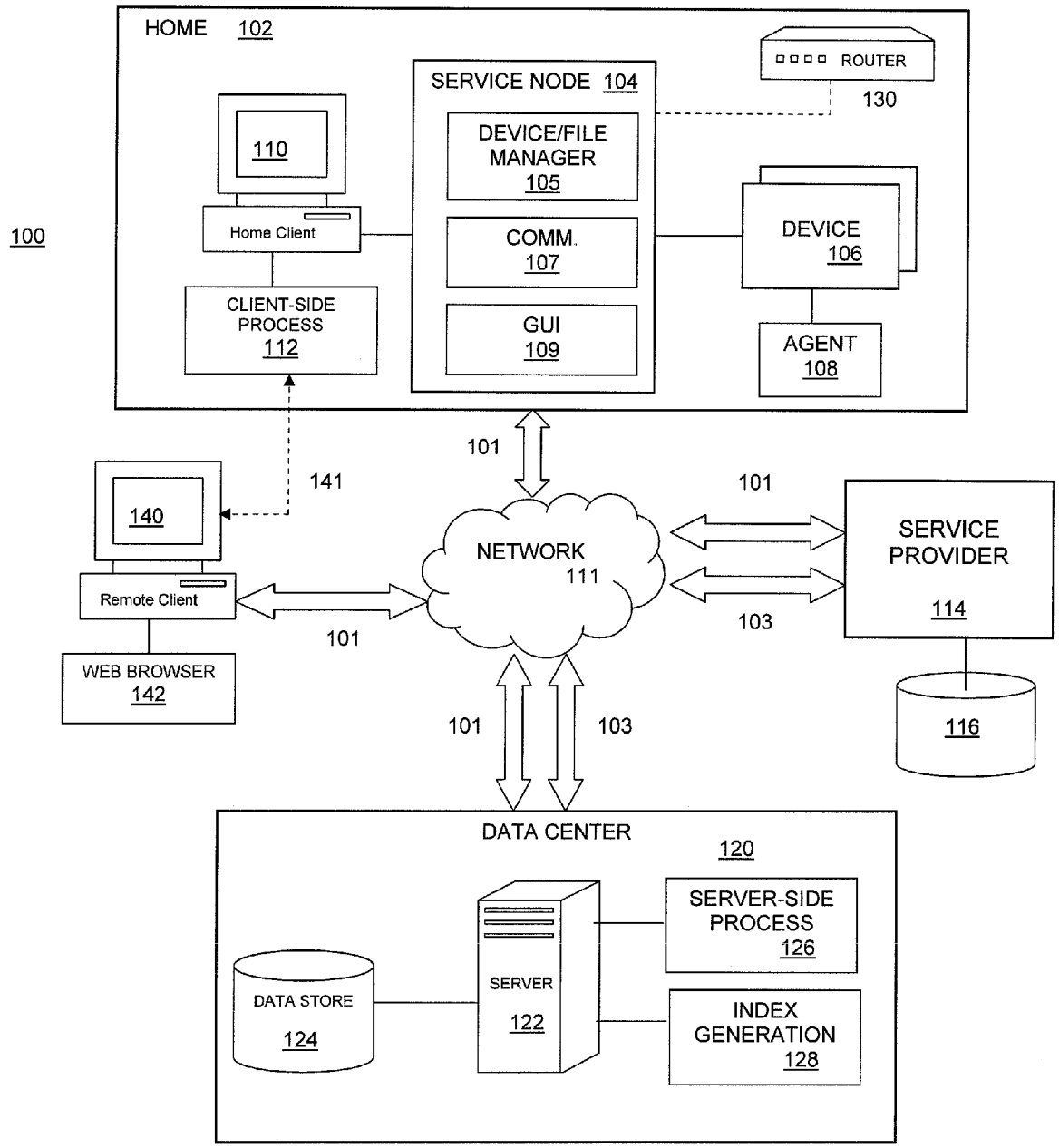
FIG. 1 illustrates a computer network system 100 that implements one or more embodiments of a home network management system.

There are several discrete steps required for establishing a home network. Under present systems, consumers are required to launch and run software application utility wizards on the PCs that they want to connect to a home network and through additional software, set-up critical networking devices, such as a router. The computer industry has attempted to automate the process with the introduction of standards such as Universal Plug and Play (UPnP Forum). This standard has long been seen as a way for home networking and consumer device manufacturers to ease and automate the set-up and discovery of devices on home networks. However, UPnP while widely available, has not yet reached its goal as an ubiquitous application for device discovery and network configuration, due largely to the complexity of the device interfaces and because of the failure of device manufacturers to completely implement the standard into their product lines. Additionally some home networking devices also require additional interaction by the consumer to complete the set-up.

Embodiments of a method and system for automatically installing and managing consumer devices in a home network environment are described. A system implements automated configuration and maintenance of devices and their peripherals that connect to the home network, in particular the establishment of a distributed system that serves as a service platform which facilitates automated discovery and initial and ongoing deployment of a home networks and the devices that may interact with or connect to their network automatically or through manual means. An embodiment is directed to a distributed system and method for facilitated automatic configuration, maintenance, and diagnostics of a local area network that in parallel provides for the interoperability of connected intelligent independent computing devices using physical layer, network layer and application layer programmatic interfaces. This distributed system provides a generalized aggregated interface that is a programmatic resource for representing a continuous and historic reference of a local network and connected devices. Embodiments include a holistic digital device service delivery across a home network through the integration of a facilitated device management system and maintaining a separate system that enables and facilitates a managed home network. It is a distributed system that takes advantage of both a 3-tier and N-tier architecture. The system is composed of an Internet-based collection of host computer systems, an embedded intelligent system appliance, intelligent software agents, and cross-platform personal computer software. The system essentially provides an aggregation resource that collects and provides to a service provider a holistic view of the entire network context in terms of the devices, applications, and interconnections among devices in the network. The system provides the ability to effect change in the network based on the context of the network.

Embodiments of the home network management system also include a monitoring and learning system for automatic issue detection and alerting. This process monitors the activity of users and devices within the home, learns usage patterns, obtains certain external market data and then applies this learning back to the network management system to improve the digital performance of the home. This system leverages the data center in network, the service node and client-side processes in the home, and agent software resident in the intelligent devices in the home to connect a knowledge base that stores data regarding certain home entities. The entities within the home are categorized as household, user, device, application and community. Each entity is further broken down into three usage classes, networking, productivity, and entertainment. The usage class denotes the predominate usage function for a particular entity. A hierarchical index model is used to assign intelligence levels to each usage class for these entities based on certain parameters. The indices reflect the relative satisfaction achieved by an entity for a particular usage. In an embodiment, the indices are ranked along a psychological need ranking that ranges from basic needs to higher order cognitive and social needs. As conditions within the home change, such as time, device usage, user changes, upgrades, problems, market conditions, and so on, the indices are updated to track the performance of the digital home. The indices can be used to generate customized services and communications to specific entities, such as by helping direct alert messages, instructions, suggestions, and other targeted communications from the network manager or service providers.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

In the following description, various examples are given for illustration, but none are intended to be limiting. The embodiments described herein provide a system for the installation, detection, and management of consumer devices in a home network environment. The embodiments described herein include a system for managing configurations of wired and wireless devices in a home network and the interface with a data center and one or more service providers to maintain these devices. An index-based home network monitoring system is implemented for auto issue detection and alerting. Activity, usage patterns, trends, and external market data are analyzed compiled and applied back to the home management system to improve the digital performance of home.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments of a home network management system. As shown in FIG. 1, the overall environment 100 comprises a home 102 containing a number of electronic and computing devices coupled to one or more other entities over a network 111. The home can include a number of consumer electronic devices 106 that perform various functions or provide various services, such as computing, entertainment, lighting and security, information management and so on. Examples of such device include televisions, CD/DVD players, cable access boxes, satellite boxes, computers, game consoles, stereo equipment, digital cameras, video cameras, home appliances, security sensors, and any other type of consumer device. Each device 106 runs an agent process 108 that allows the device to be configured via a service node 104. The service node represents a customer premise equipment device that is configured to communicate with and facilitate the management of any number of compatible devices 106. The service node 104 includes a number of functional components that provide device and file systems management 105, communication functionality 107, and user interface functionality 109, as well as other functions. The service node essentially accomplishes the tasks of facilitating the management of the home local area network (LAN), monitoring the operational aspects of each of the devices 106 within the LAN, executing various policies, performing integrity checks, and facilitating the remote processing of the system, including software updates and diagnostics. The policies can include service provider policies that dictate how a service provider wishes to manage a device; device specific policies, such as configuration options; and system specific policies, such as user privileges, resource sharing, and security protocols.

The service node may be coupled, either through wired or wireless communication links to the devices 106 and a home client computer 110. In one embodiment, the home client 110 executes a client-side process 112, which provides a comprehensive graphical user interface for display and input control of the functions provided by the service node. The client-side process 112 is a browser-based application that provides a view into the deployed service node system. The client-side process represents a client portal application that allows the homeowner or system administrator to monitor connected devices 106 in the home network. The home client computer 110 may be any type of workstation or personal computer class device, such as a PC, notebook computer, personal digital assistant, or similar computing device. Alternatively, home client 110 may be a mobile client device, such as a cell phone, smartphone, or any mobile communication device that provides access to the home network environment and has a sufficient degree of user input and processing capability to interface with the service node 104, as well as sufficient capabilities to display a reasonably comprehensive user interface page. The client computer 110 may be coupled to the service node 104 over a wired connection, a wireless connection or any combination thereof.

The agent process 108 is installed on each device 106 and acts as a proxy to the service node 104. Agents can be installed on any active device, that is, one that can store and execute programs supporting a defined operating system. Examples of such operating systems include Linux, Microsoft® Windows XP™ or Vista™, Apple® Mac™ OS X, and so on.

The home network environment 102 is coupled to a data center 120, which provides various back office functions to support the functionality of the service node 104 within the home 102. The data center 120 includes one or more server computers 122 executing server side process 126 that comprises enterprise class software including automatic configuration server (ACS) processes, operational support system (OSS) processes, and business support systems (BSS), among others. In one embodiment, the network 111 is the Internet network, and service node 104 and the data center 120 communicate through secure channels 101 over the Internet using standard IP (Internet protocol) communication. The communication may be encrypted for secure transmission. A single data center may support any practical number of home environments 102, depending upon processing and storage capacity. The data center essentially accomplishes the tasks of providing a provisioning mechanism for the service node 104, recommending policies and updates for the home network 102, providing an interactive view of the home network, and providing a repository for each home network through one or more data stores 124. The data center may be connected to the Internet through a secure communication channel over a VPN (virtual private network) 103 or through an encrypted communication channel 101.

As shown in FIG. 1, the home network 102 and data center 120 are coupled to a service provider platform 114 through network 111. The service provider may be any entity that provides technical support related to any of the devices 106 or home network infrastructure. Such entities may be device manufactures, retail establishments, computer consultants, telecommunication companies, network installation professionals, or any type of service provider who may provide products or expertise utilized by the homeowner or system administrator. In an embodiment, the home network management system is designed to be implemented as part of an automated managed home network service delivery platform that is provided by a service provider 114, which may be a home IT Services Company or Internet Service Provider/Broadband Service company to its consumer. Such a service can be offered by a third party. The service acts as an automated technical support technician that is capable of managing all of the devices 106 configured for a customer's home network while also providing its customer with simple facilities for notification, integrated management console and access to their subscribed services. The service provider platform 114 may be connected to the Internet through a secure communication channel over a VPN (virtual private network) 103 or through an encrypted communication channel 101.

In system 100, the home LAN 102 is coupled, directly or indirectly, to one or more server computers 122 or other resource computers through one or more possible networks, such as wire or wireless (e.g., cellular) telephone networks and/or the Internet 110. The network interface between server computers and the client computers may include one or more routers 130 that serve to buffer and route the data transmitted between the server and client computers. Network 111 may be the Internet, a Wide Area Network (WAN), a Local Area Network (LAN), or any combination thereof. The client-side 112 and server-side 122 processes may represent one or more executable programs modules that are stored within an associated computer and executed locally within the computer. Alternatively, however, they may be stored on a remote storage or processing device coupled to the associated computer or network 111 and accessed by the computer to be locally executed. In a further alternative embodiment, the server-side process 126 may be implemented in a plurality of different program modules, each of which may be executed by two or more distributed server computers coupled to each other, or to network 111 separately. In an embodiment in which network 111 comprises the Internet, a web server process comprises a gateway for data center 120 communication with the client. The web server can be a separate web server or, in some cases, it may be a process executed locally in server 122.

In one embodiment, the client device 110 executes a client-side process 112 to interact with the server-side process 122 and to allow implementation of configuration changes autonomously on the mobile device. A separate content provider, e.g., service provider 114 may provide some of the data that is included in the configuration management process. Data for any of the configuration parameters, rules, and the like may be provided by a data store 116 or 124 closely or loosely coupled to any of the servers 122 or service provider platforms 114. The client-side process 112 represents agent code that resides on the home client computer. This agent code provides user interface functionality for the service node 104, as well as management of the devices 106 through proxy and proxy agent emulator routines. For an embodiment in which the service node operates as a standalone unit with no client computer support, the service node executes agent emulation code that runs locally on the service node.

The service node 104 can be configured to provide a user interface portal to the managed home system that is accessed through a web browser from either the home computer 110, a server computer 122, or the node device itself 104. This portal can also be accessed by other external computers, such as remote client computer 140. The remote client 140 runs a web browser process that accesses the home LAN 102 through the Internet 111. This provides a virtual link 141 to the home client 110 and/or the service node 104. The remote client 140 allows a user to access the home LAN through an external computer. It also allows authorized agents (e.g., tech personnel) to access the home LAN 102. Appropriate security policies can be established to ensure only authorized access to the system.

The system of FIG. 1 provides a comprehensive home network management system that provides great improvement over prior products based on isolated utility applications that perform separate hardware, software, and network test functions, and require installation of separate device management gateway application tools, and remote specialist support to specific client computers. System 100 allows a service provider 114 to deliver a managed integrated service that combines probes, intelligent agents 108, and automated systems to solve the user's problems with their home networks and devices before they are aware a problem may exist. Additionally, unlike existing systems, the combined diagnosis, repair, maintenance, and management can be done without the service providers' customer having detailed technical knowledge.

In general, the service node processes are based on service oriented architecture (SOA) principals. For both the home environment 102 and the data center 120, the required functionality is deployed using standards-based frameworks. Every system entity, including the service node 104 is modeled as a service and may take the role of a service provider or a service requester, or both. A service may be a simple standalone service or a composite service, and service discovery is performed through a service registry.

Service Node

Within the home network environment 102, the service node 104 acts as the central resource for managing devices 106 and interfacing to the data center 120 and any available service providers 114. The client-side process 112 executed on a home client 110 represents an alternative interface to the control functions provided by service node 104. The service node provides a framework that allows continuous deployment of applications and services in run-time. These include control functions, such as dynamic installation, updates, and activation/deactivation of services. The service node also provides integration points through high level application program interfaces (API) for third party integration.

Figure 2:
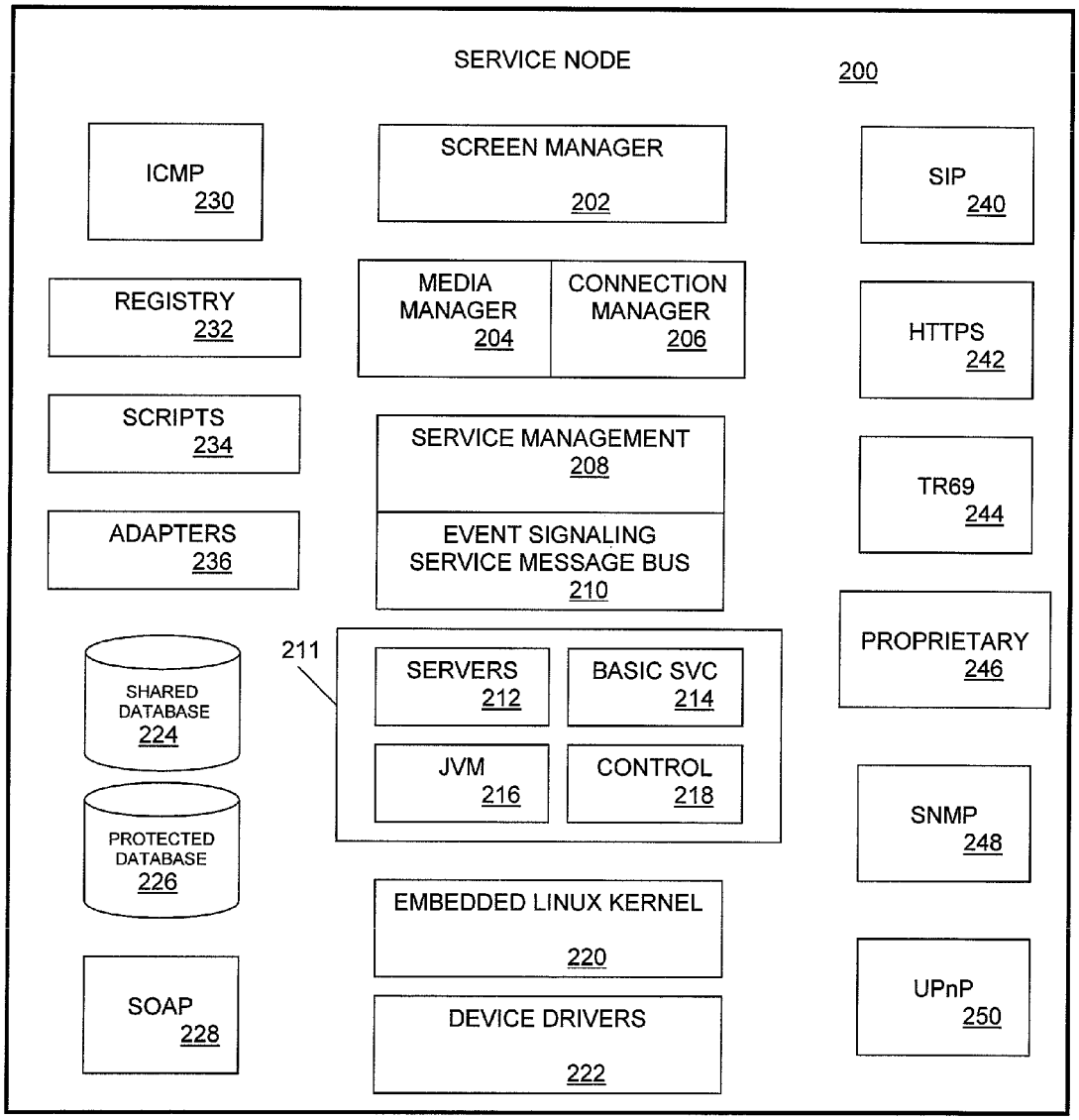
FIG. 2 is a block diagram of the functional components of a service node, under an embodiment.

FIG. 2 is a block diagram of the functional components of a service node, under an embodiment. The service node comprises a number of different functional modules and may be implemented as a layered and distributed Java-based SOA framework. The service platform of the service node provides the devices 106 with the APIs to register and advertise their services in the service node. In turn, the service node can launch a single or composite service to accomplish one or more pre-defined tasks. In one embodiment, these tasks are modeled as templates and executed within a workflow engine. Some of the processes can be executed automatically through a process of retrieving values from the data center 120, while others may require user intervention, such as requiring user action to approve the launch of an installation. The service node implements an OSGI (Open Services Gateway Initiative) framework to allow the devices and application to register their services in the service node's service directory. It also allows the entities to subscribe to and receive events signaling changes to the registry for a given service.

In one embodiment, the service node system 200 is built around an embedded Linux kernel 220. The main functional components include device drivers 222 that control the devices 106, a screen manager 202 that implements the GUI functionality 109 of the service node, medial manager 204 and connection manager 206. The service node 200 also includes a comprehensive file system that includes one or more databases, such as shared database 224 and protected database 226, and data structures for a registry 232, scripts 234, and adapters 236.

The service node 200 includes several protocol stacks that are supported as part of network monitoring, management, and operations. The protocol stacks are wrapped in containers and viewed as a deployable service within the entire home network management system.

The service node 200 also includes several different modules for various communications protocols for interfacing with the devices 106. In one embodiment, the service node implements the Universal Plug and Play (UPnP) protocol 250. UPnP is a set of computer network protocols that allow the devices 106 to connect seamlessly in order to simplify the implementation of networks in the home for data sharing, communications, and entertainment, and in corporate environments. UPnP achieves this by defining and publishing UPnP device control protocols built upon open, Internet-based communication standards. The UPnP architecture allows peer-to-peer networking of PCs, networked appliances, and wireless devices. It is a distributed, open architecture based on established standards such as TCP/IP, UDP, HTTP and XML. Thus, communication can be over any protocol, such as UPnP, UDP, TCP-IP, Zero-conf, HTTP, or HTTPS.

In one embodiment, the service node takes the role of a UPnP control point. A discovery task running on the service node performs first level analysis on the home LAN, creates a topology map and shares a subset of results with the data center 120. After the initial boot, self-check, and discovery tasks are completed, the service node checks for an IP connection. If the Internet connection is available, the service node registers with the ACS server in the data center 120 through a protocol such as session initiation protocol (SIP) 240 or simple object access protocol (SOAP) 228.

Through the UPnP architecture, the service node 200 also supports zero-configuration (Zeroconf) networking. Under the Zeroconf specification, a UPnP compatible device from any vendor can dynamically join a network, obtain an IP address, announce its name, convey its capabilities upon request, and learn about the presence and capabilities of other devices. This provides for the discovery of local services through multicast DNS (domain name system) within a local network, usually without the need for configuration or special servers. Many different Zeroconf solutions exist, such as Bonjour™ from Apple® Inc., which uses multicast DNS and DNS Service Discovery.

As shown in FIG. 2, the service node 200 also includes several other protocols for implementing home network solutions. This includes the TR-069 specification 244 defined by the Broadband forum (DSL forum), which provides tools for auto-configuration and dynamic service provisioning, software/firmware image management, status and performance monitoring, diagnostics, and file download initiation through server push or client pull models. Other specifications that may be used include SNMP, HTTPS, DOCSIS (Data Over Cable Service Interface Specification) 3.0, TR64, and TR69.

The service node 200 implements the simple network management protocol (SNMP) 248 to act as a network management agent (NMA), which gets high level instructions from the data center 120. The data center acts as a network management system (NMS) instructing the service node with "Get" and "Set" operations to executed on a target managed entity, such as a router 130, computer 110, or other device 106. The Get and Set operations are used to obtain status and to modify the properties of a particular device, application or other entity.

The service node can also implement aspects of the OMA-DM protocol defined by the Open Mobile Alliance for functions related to device management (DM), data synchronization (DS) and file downloads. This can include java-based protocols for downloading files and applications onto mobile devices through various over-the-air (OTA) protocols. The service node 200 also includes an automated configuration server (ACS) module 211 that provides provisioning and maintenance functions for the service node. The ACS provides the primary control point for the service node and implements a web service API over secure channels.

Figure 3A:
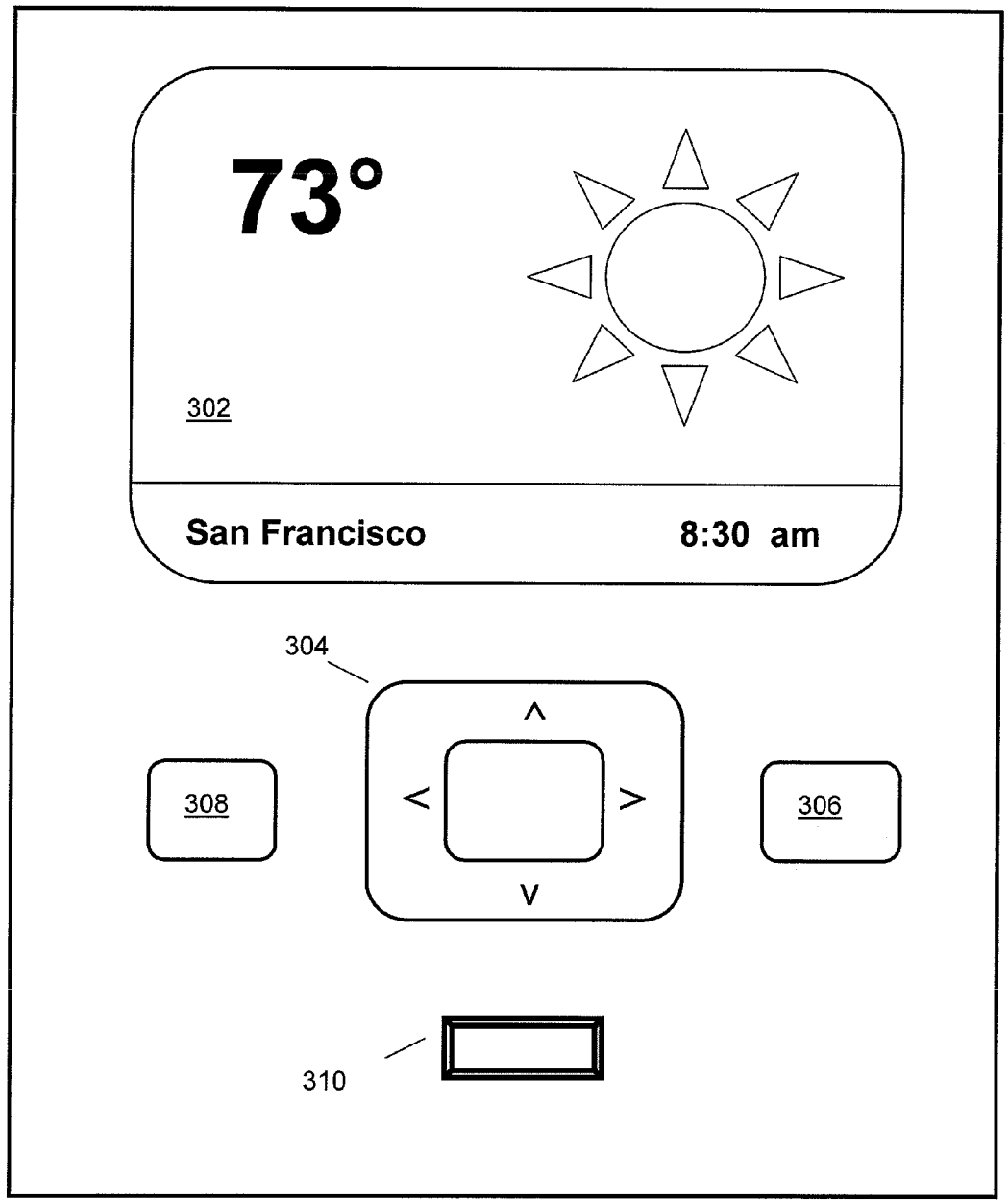
FIG. 3A illustrates an external representation of a service node, under an embodiment.

The service node may be physically implemented in several different embodiments. It may be provided as a set-top appliance that can be directly or indirectly coupled to the home computer 110 and the devices 106, it may be provided as an add-in card or peripheral that is closely coupled to the home computer 110, or it may be provided as firmware functionality implemented through one or more of the devices 106 or central home devices, such as computer 110 or even router 130. In one embodiment, the service node is implemented as a standalone unit (box) that can be centrally placed within an average size home. FIG. 3A illustrates an external representation of a service node, under an embodiment. The service node unit 300 comprises a box that includes a front panel housing a user interface display, and one or more control buttons and interface ports. The user interface display 302 can be any suitable type of electronic display such as a liquid crystal display (LCD) with either color or monochrome capability. It provides the graphical output to the user and can display static or dynamic (video) images. The screen manager component 202 controls the content displayed on through display 302. This can include any information related to the home network, such as topology, device status information, data center information, service provider information, environmental information, and any other appropriate information. It may also serve as the output display for any of the devices, such as media playback devices, and the like. The display can be configured to display certain information when in default mode, such as current temperature, weather, time, and location information.

The control buttons 304 on the service node device include navigation buttons 304 to navigate a cursor or text entry prompt within the display area 302. One or more other control buttons 306 and 308 may be provided to invoke specific functions of the control box, such as changing display settings, access the data center, accessing specific service node functions, and so on.

Figure 3B:
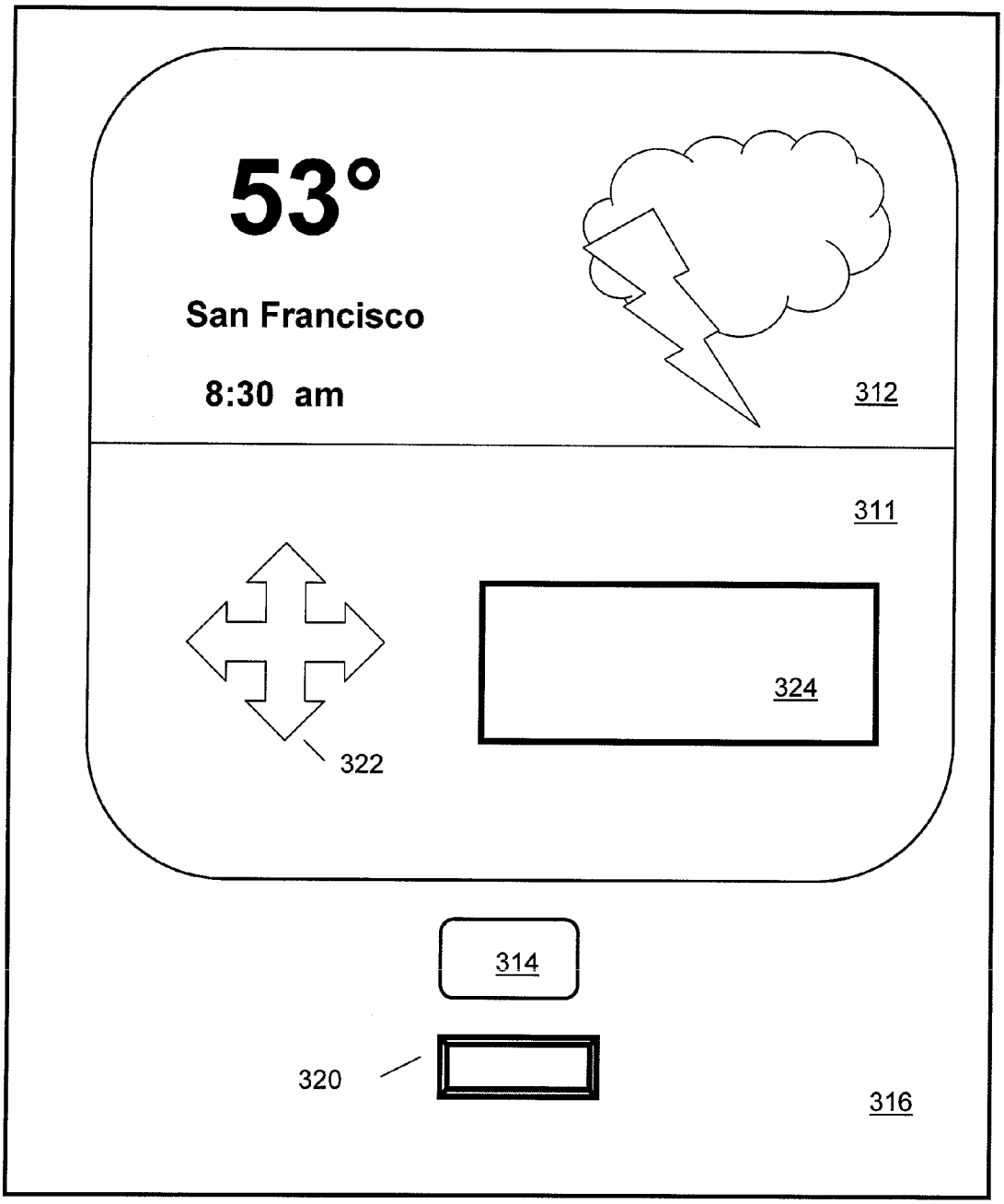
FIG. 3B illustrates an external representation of a service node, under an alternative embodiment.

User input to the device 300 may be provided by an integrated or closely coupled keyboard, trackpad, mouse, or other similar input device. In an alternative embodiment, the keyboard virtual keyboard accessed through a touch screen display. FIG. 3B illustrates an external representation of a service node, under this alternative embodiment. In this embodiment, the display of device 316 comprises a display area 312 and a touch-screen portion 311. This touch screen portion may display one or more user input objects, such as navigation buttons 322 and keypad entry area 324. One or more physical control buttons 314 may also be provided.

The service node may include one or more different communication interfaces for transmission of data to and from the devices 106 and home computer 110. It may include one or more ports or wireless transceivers for communication, depending on the communication protocols that are utilized. The service node unit may also include a voice recognition component to allow the use of spoken commands.

As shown in FIGS. 3A and 3B, the service node unit includes a USB (universal serial bus) port 310 or 320. In an embodiment, the USB port is configured to accept a standard or custom USB flash drive that stores data related to the home network. The flash drive is used to store and transmit information among devices in the network, and, if necessary, to the data center 129, and/or any service providers 114.

It should be noted that the embodiment illustrated in FIGS. 3A and 3B are primarily for purposes of illustration, and many different variations are possible. The control box may be implemented in a box of any practical shape and size, and made of any appropriate material. The display screen, control buttons, and interface ports may be provided on any side or surface of the box and in any desired configuration.

Data Center

The data center 120 comprises one or more server computers 122 executed a server-side process 126 that utilizes data provided by data store 124. In one embodiment, the server-side process 126 includes two sets of enterprise applications used by the service provider 114. An automatic configuration server (ACS) is included to provide provisioning and maintenance functions for the service node 104. As the primary control point for the network management system, it implements a web service API over secure channels. The second component comprises an operational support software (OSS) and business support software (BSS) block. This can be aggregated with a decision support system (DSS) for the technical support staff of the service provider 114 through a web-based portal. An enterprise service bus (ESB) can be used to integrate the internal and external systems of the data center 120. The data center stores the properties of the physical, logical and service components of the home network in a relational database within data store 124. The information maintained in the database can include user information, device information, applications, network protocols, service packages, usage history, problem logs, and any other appropriate information.

In certain implementations, use of devices 106 within home 100 may be subject to usage restrictions, such as parental controls, environmental controls, and so on. In this case, the server-side process may be configured to control and store information related to such use, such as user privileges, parental controls, usage history, usage characteristics, power consumption, and so on. In many home and office environments that provide access to computer devices, user privilege is an important characteristic of installation and control. Various sensitive resources, such as computer files, personal data, and other resources may be exposed through use by family members and guests. The data center can be used to strictly enforce user access privileges in accordance with defined rules. FIG. 4 is a table that illustrates an example of user privilege restrictions for use with a managed computer system, under an embodiment. For the example of FIG. 4, three classes of user are defined, users with password, users without a password, and guest users. Each class has different levels of access to resources, such as files, services (e.g., network access, web access, resident or downloadable applications, etc.), printers, and other networked devices (e.g., game platforms, routers, etc.).

The data center may also be used to control the configuration of such devices, such as setting of certain security or access attributes and allowing for degrees of customization. For interfacing with service providers 114, the data center may store information relating to support history, such as application use, network maintenance, installation details, device configurations, service outages, and the like.

Management Operation

As shown in FIG. 1, the service node is configured to facilitate the control any number of devices 106, each executing a corresponding agent process 108. In general, the devices can be adapted for use by the system or pre-configured for use by the system. For example, a service provider may provide its customer with an appliance that can either be plugged peripherally into a PC, or directly into a working home network. Through the service node, the appliance automatically upon connection discovers its connected environment and probes for other devices. When devices are discovered the appliance catalogs the devices, the resources and services available on the device. By regular catalog analysis, the service node determines the best means for configuring the devices for stable network connection and application interoperation requirements with the other devices as appropriate, and deploys intelligent agents which are able to facilitate configuration of the devices for which is has been deployed.

In addition, the service node has an external facility for a forced discover process to manually begin an automated process to configure devices for use and interoperation on the home network and integrated as described above for inclusion in the catalog. The service node 104 and agent process 108 work together to proactively maintain a healthy home network and provides the facility for delivering automated maintenance tasks in support to keep connected devices healthy. Both the service node and agent have facilities for notifying customers of problems that can not automatically be repaired. When a home network is connected to the public Internet 110, the service node 104 and/or intelligent agent 108 periodically connect to the data center host computer 120 through a web services application interface. The data center 120 provides a collection of additional services made up of several databases which record the catalog of the home network. At the request of the service node 104 and agent 108 it provides resources that enable the ongoing maintenance and management of the home network and the devices in the catalog.

Service providers 114 using the public Internet 110 can access the data center 120 through a web services application interface to obtain information regarding the customer's home network, such as last known state, and connected device configuration. The data center 120 is configured to provide the service provider 114 with a number of resources to augment proprietary CRM (customer relationship management) systems relative to the information and as well deliver customer support for the managed home network subscriber. The data center 120 will also provide automated resources for real-time interaction with the home network when possible. The services delivered by the system are based upon established standards of interoperation of the devices in the catalog and executed by policies set by the service provider 114.

Figure 5:
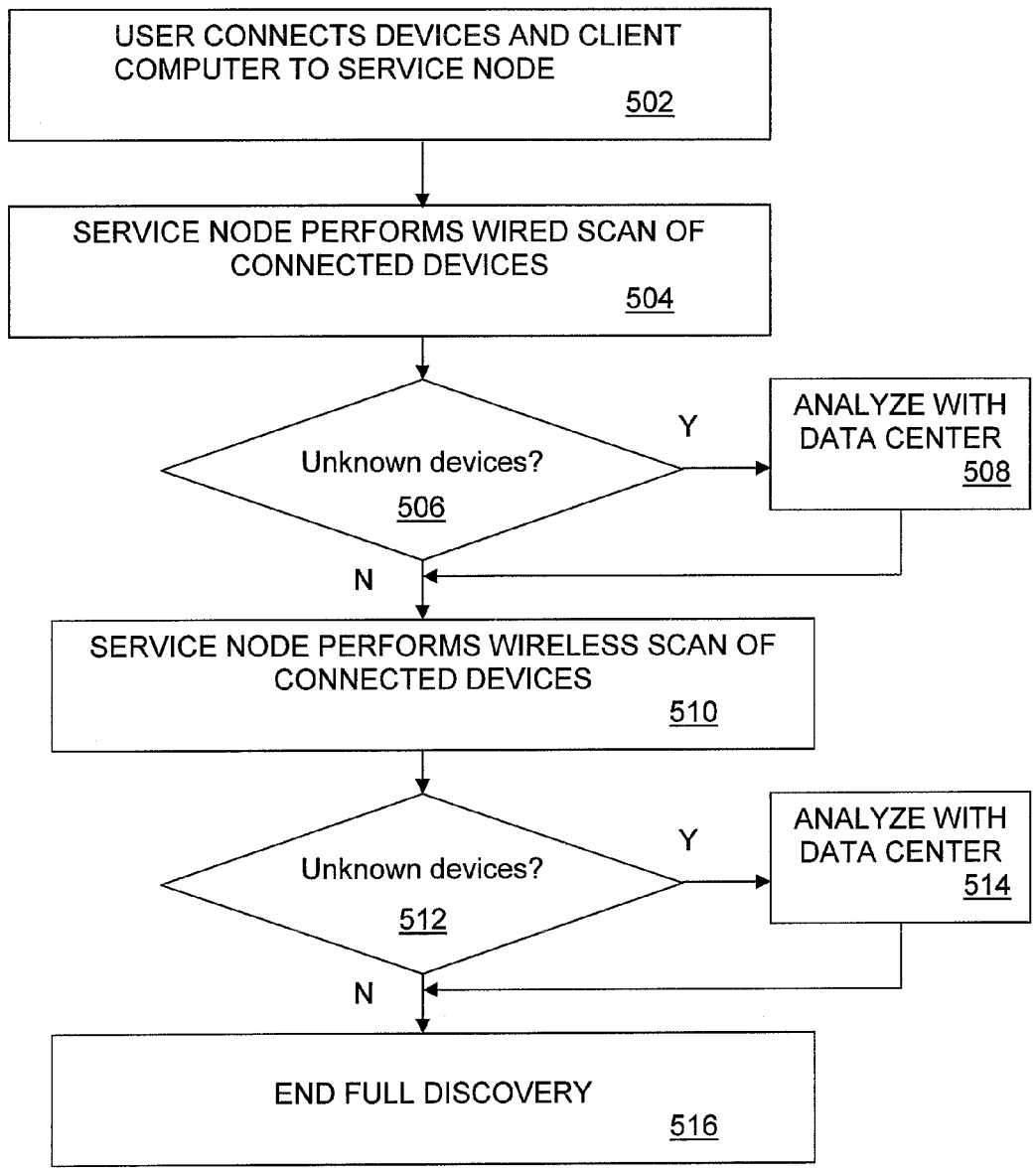
FIG. 5 is a flowchart that illustrates a method of home network installation, under an embodiment.

The service node 104 can be pre-configured for use in a particular home environment 102 or it can be installed and configured for use in any home environment in conjunction with data center 120. In this case, the installation process involves connecting the service node to a home client computer 110 and executing an installation routine that access the data center 120 through a home router 130 or through the client 110. Once the service node is properly installed, the home network can be set up through registration of the devices 106 with the service node 104 and home client 110. FIG. 5 is a flowchart that illustrates a method of home network installation, under an embodiment. FIG. 5 illustrates a method of performing full discovery of devices that may be connected through wired or wireless connections to the service node. In block 502, the user connects any wired devices to the service node and/or activates the wireless transceiver in the service node for communication with any wireless devices within range. The service node then performs a wired scan of the connected devices, block 504. During the device discovery phase, the service node detects the presence of a device or an application through USB, UPnP, SNMP or ICMP protocols. If a client computer 110 is coupled to the service node, the service node or the client-side process 112 of the client computer checks the router IP table to determine if there are any connected devices. Other resource listings of the client computer may also be used, such as a device registry.

In block 506 it is determined if any unknown wired devices are detected. If there are any unknown devices, the data center is queried to determine whether the unknown devices are supported, block 508. If the device is known to the data center, the appropriate information is passed back to the service node, otherwise, an error message is flagged and any product information is noted. At this point, a service provider may be identified and contacted to provide the appropriate information; otherwise, the device is flagged as "identified" and unsupported. In addition to wired devices being detected, the service node performs a wireless scan of connected devices within range, block 510. In block 512 it is determined if any unknown wireless devices are detected. If there are any unknown devices, the data center is queried to determine whether the unknown devices are supported, block 514. If the device is known to the data center, the appropriate information is passed back to the service node, otherwise, a system message is generated that an "identified", but unsupported device has been detected and any product information is noted. At this point, a service provider may be identified and contacted to provide the appropriate information; otherwise, the device is flagged as unsupported. The service node as well as the agents are listening for new devices as they connect to the home network. Block 516 indicates the end of the full discovery process.

Once the devices are detected, agents 108 can be installed on each device. In the case where the device or devices are a computer or device with a USB port, a physical USB key can be used to install the agent directly onto each computer. In one embodiment, the USB key is implemented in a customized USB flash drive. The key may be implemented as a flash memory device that has the read/write space partitioned away to prevent use as a standard flash drive by the user. The USB key has a hardware controller to provide enumeration of USB device ports and an installation program that is executed locally on the computer to install the agent and register the computer with the system. The key can be updated by the service node 104. The key is used for adding new devices to the network. In general, the first device defined in the network is physically coupled to the service node through a USB (or equivalent) cable. All subsequent devices are added using the key.

Devices that are not able to use the key are discovered and facilitated by a remote agent resident in the service node, with a fail-over remote agent in the client-side process 112 of the PC 110. For devices that do not have a USB port, or sufficient processing power to execute the agent installation process from the key, the agent process can be pushed onto the device through the appropriate wireless or wired protocol. In this case, an installation process executed on the service node or the client computer may and may be executed through the service node GUI.

The service node can also be configured to set any wireless security protocols defined by the system and/or the wireless devices in conjunction with policies determined in advance by the service provider. As the devices 106 have been properly detected through the discovery process, the data center can build a topographical map of the home network environment. Various operational and setup parameters regarding the devices are stored in one or more databases in data store 124.

In an embodiment, each device 106 has installed on it an agent process 108 that acts as a communication conduit to the service node 104. If the service node is missing from the system, the installed agents for each device can poll one another and alternate as fail-over domain authority for communication to the data center 120. The agents keep track of relevant transactions, such as software and device installation/updates, configuration changes, and so, for the device on which they are installed. Agents receive instructions from the service node 104, as well as from the data center 120, as appropriate to policies and local conditions/states, to facilitate management of the devices.

The agent includes two main components: an interface to transfer data from the service node to the device, and a cross-platform module. For home devices with the appropriate computing/system resources and port configuration (e.g., USB), the key is used to install the agent 108. In certain cases, the key stores all service resource information for existing devices. Upon installation of a new device, it takes an inventory of the characteristics, operating states, and resources (e.g., files, input/output ports, etc.) of the device. If any similar devices are already loaded on the key, certain parameters may be downloaded to the new device to facilitate configuration. For example, if a second PC is installed, the parameters for shared resources (e.g., files, devices, etc.) from the first PC can be transferred to the second PC through the key. Once the information is obtained for the new device, it is written to the registry. The registry is a data structure that contains all relevant information regarding the device and is a component of the network topography. The registration process consists of writing new device data to the registry, as well as informing all other devices in the network of the existence of the new device. The topography is then updated to reflect the new network. This topography defines the relationship among the devices, the characteristics of each device, and policies among the devices, such as file/resource sharing, user privileges, security, and so on. The topography provides not only a physical mapping of the home network, but an overall operational context for each device within the network relative to all other devices in the network. In this manner, the effect of any changes or problems with one device can be quickly detected for any other device. This system also provides a comprehensive view for the service provider with regard to the entire network, as opposed to a particular device. For example, a service provider may receive a message regarding a problem with a specific device. Through the topography, the service provider can see all other devices connected to the device, and may therefore have a better idea of the problem cause or solution given the context of the entire network.

As the home network is established with discovered devices, and the registry has been built with definitions of the devices, the ongoing usage activities include monitoring devices, adding new devices, removing devices, updating devices, troubleshooting and repairing devices, reconfiguring devices, and similar tasks. The ongoing usage tasks can be initiated and performed by the user directly, or they may be automated with minimal user input.

The configuration of devices within the network can be facilitated by the use of defined and distributed drivers for such devices. Such drivers can be provided by service providers or other third parties, or they may be defined by the data center. In the case of problems with installed devices, problems may be detected by the user, by the device itself, and/or by the service node. In certain cases, an autofix routine may be available to diagnose and fix the problem before a user is ever aware. Such a routine may be deployed automatically by the service node, or available from the data center or from the service provider for deployment from the data center. If an autofix routine is not available, the user may be instructed via the service node to access documentation (e.g., through a website) to try to solve the problem himself or herself or to contact an appropriate service provider.

Figure 6:
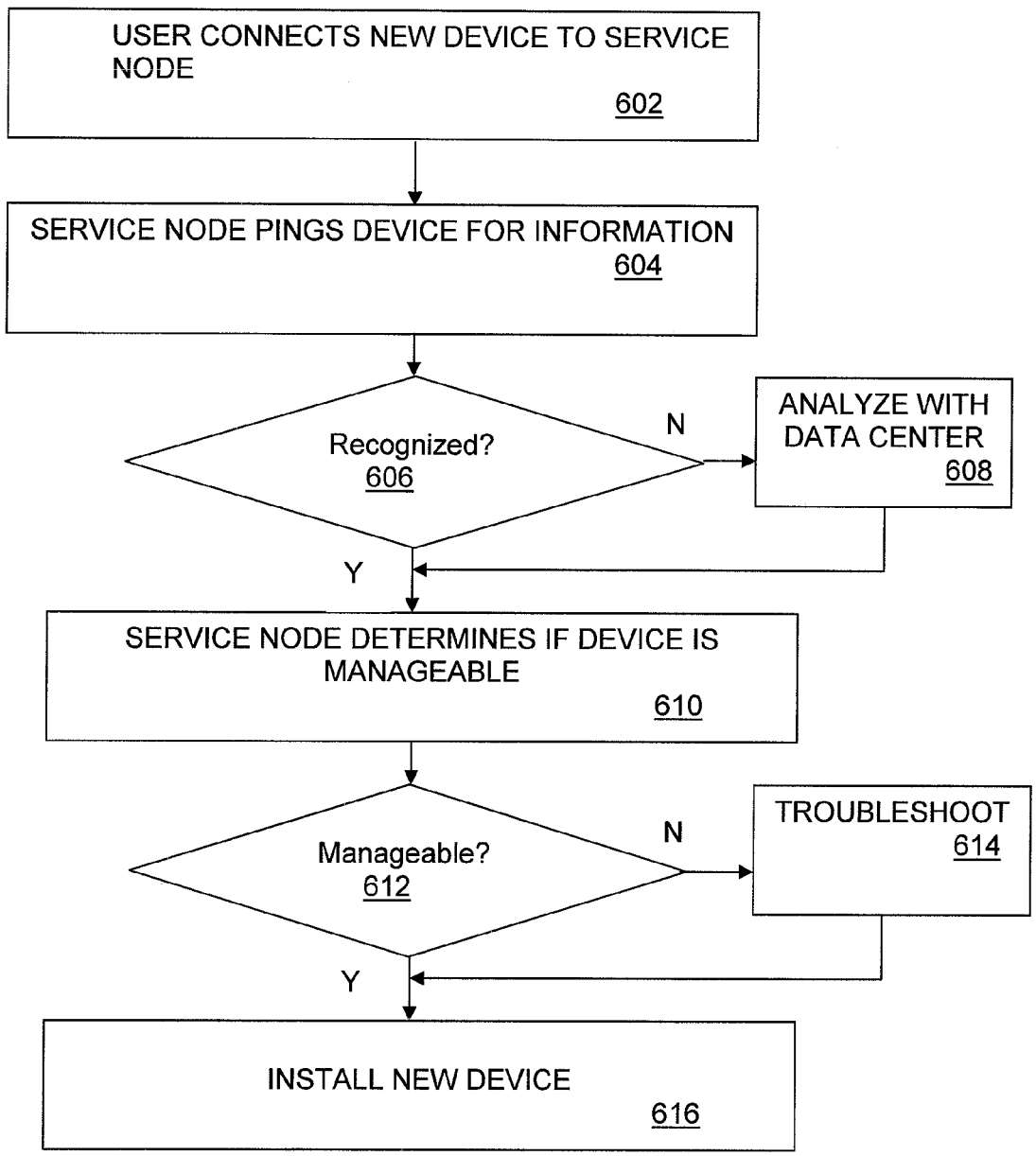
FIG. 6 is a flowchart illustrating a method of installing a new device into a home network, under an embodiment.

One issue surrounding home networks is the addition of new devices. In present systems, a user must often go to great lengths to properly install new devices. Embodiments of the system allow for automated installation of new devices using the service node and data center system of FIG. 1. FIG. 6 is a flowchart illustrating a method of installing a new device into a home network, under an embodiment. In block 602, the user connects any new wired devices to the service node and/or activates the wireless transceiver in the service node for communication with any wireless devices within range. The service node then pings the new device for any available information, block 604. In block 606 it is determined if the new device is recognized. If it is not recognized, the data center is queried to determine whether the new devices are supported, block 608. If the device is known to the data center, the appropriate information is passed back to the service node, otherwise, an error message is flagged and any product information is noted. At this point, a service provider may be identified and contacted to provide the appropriate information, otherwise, the new device is flagged as unsupported. Once the device is recognized, the service node determines if the new device is manageable, block 610. If, in block 612 it is determined that the device is not manageable, a troubleshooting process is performed. Once a the device is recognized and determined to be manageable, it is installed, typically by loading the appropriate driver and registering the device with the data center.

FIG. 7 is a table that illustrates actions associated with addition of a new device in a managed home network, under an embodiment. The table of FIG. 7 provides the processes executed at various stages of the new device installation process of FIG. 6, such as in the case where a new device is not recognized or determined to be not manageable.

In certain cases, devices in the home network may be desired to be removed. Device removal may be initiated by the user or by the service node or the client-side process 112. The removal of devices typically involves the identification of devices to be removed and the uninstallation of device drivers and associated software. The network map and registry in the data center 120 is then updated to reflect the removal of the device. The user can then physically remove or otherwise disable the device. In certain circumstances, a user may wish to remove the device from the managed network, yet still use the device as a standalone device. In this case, the device may be removed from the network or it may be flagged as an unmanaged or disabled device.

The home network management system also implements a monitoring function to track the operability (health) of the devices and entities of the network. The devices, service node, client computer, agents, data center, and communication lines to the service providers can all be constantly monitored. The relevant databases that stored information with each monitored object are also monitored to ensure that information and update/upgrade information is accurately reflected.

User Interface Implementation

In one embodiment, the service node 104 provides a user interface portal to the managed home system that is accessed through a web browser from either a home computer 110, remote computer 140, server computer 122, or the node device itself 104. The user interface portal provides a mechanism for service providers 114, authorized agents (e.g., through remote client 140), and the data center 120 to view the home LAN environment 102 and any relevant characteristics of the network. The user interface is provided as a series of hierarchical or linked web pages, with any number of subwindows for displaying data objects and related information or data entry elements.

Figure 8:
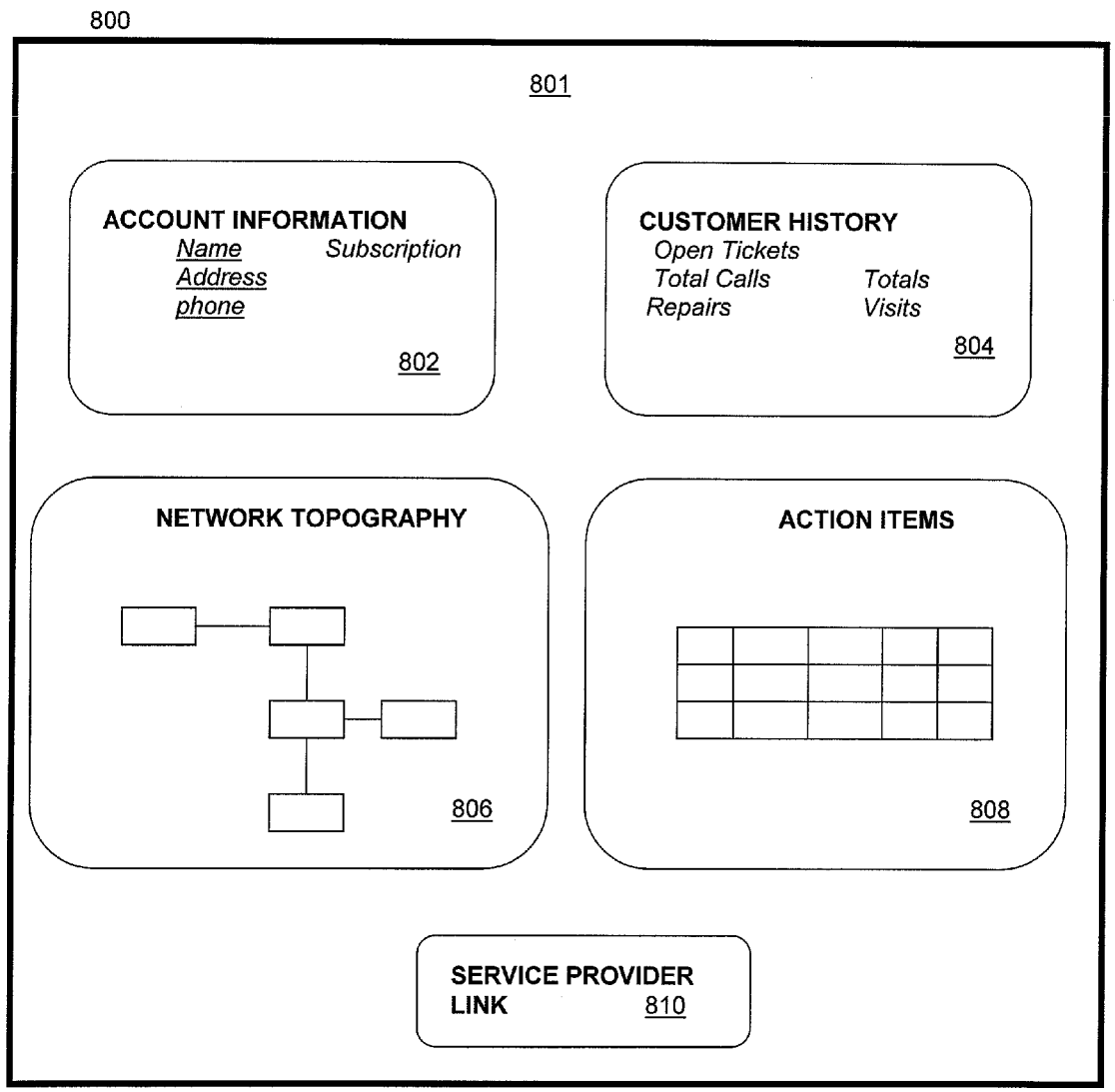
FIG. 8 illustrates a first level display page for a web-based user interface for the home network portal, under an embodiment.

FIG. 8 illustrates a first level display page for a web-based user interface (UI) for the home network portal, under an embodiment. The web page 800 includes several different display areas that display elements of the network and, if appropriate, allow user input to enter or get information or select other regions of the UI. The main display area 801 of web page 800 includes display areas related to the customer or homeowner, such as account information 802 and customer history 804. The lower portion of the screen 800 has a home network overview display area 806, which displays the topology of the network. The network topology comprises a representation of the network element (devices and computers) in the network as well as their interconnections. It can be provided as a graphical map, an indexed list, or any similar representation. Also provided in screen 800 is a list of action items 808. This display area provides a view for the service provider 114 to view likely issues and provide an indication of why the customer may be calling based on conditions reported by the service node to the data center. The display screen 801 also includes a link 810 that provides access to the service provider web site. Depending on the number of service providers available, any number of links can be provided. This display area could also be used to display certain pertinent information regarding the service provider(s), including, for example contact information, configuration instructions, latest patches, and so on.

The display screen 800 is provided only as an example, and it should be understood that many other configurations and display elements can be implemented to embody the UI portal of the home network management system.

Figure 9:
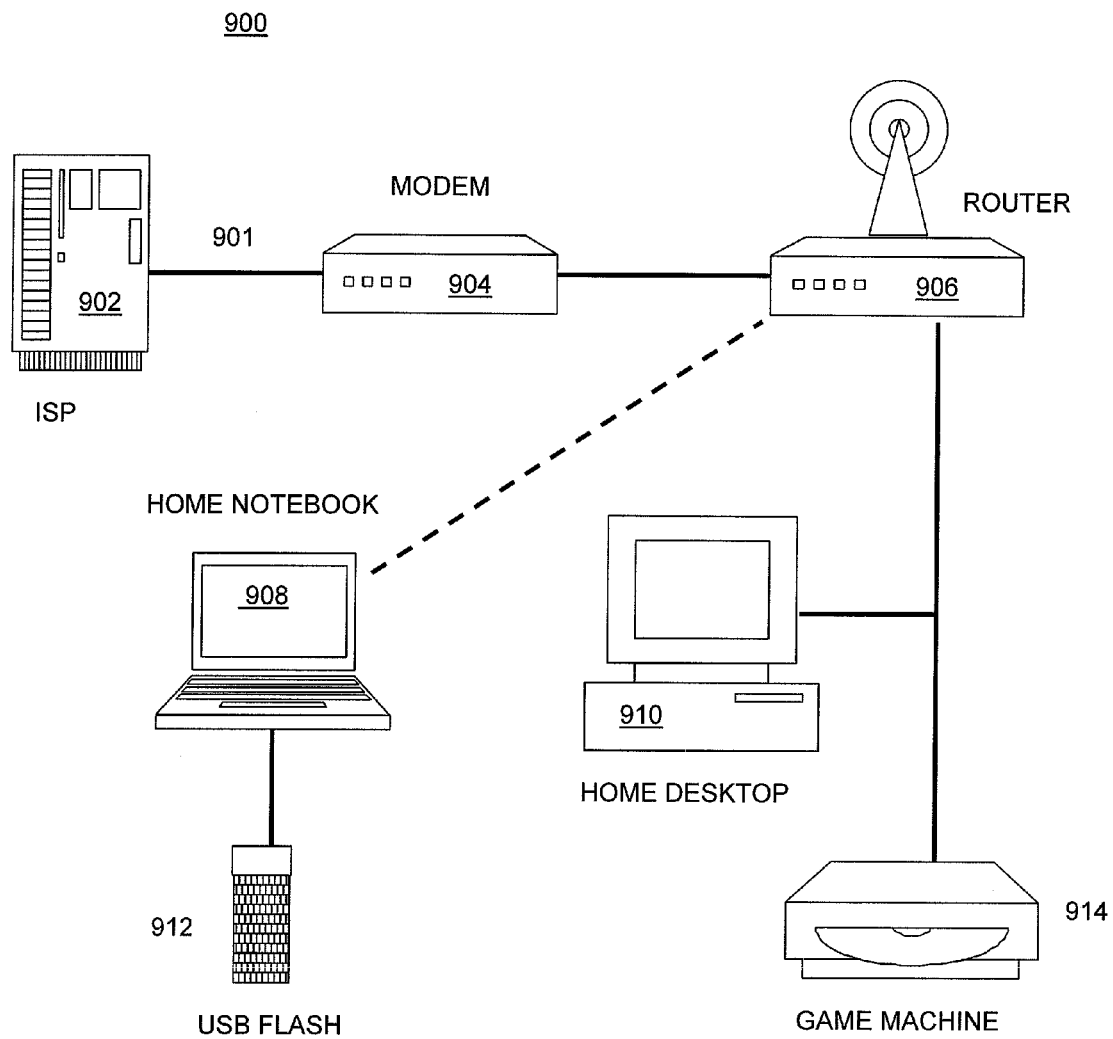
FIG. 9 illustrates an example of the display of a network topology, under an embodiment.

The network topology displayed in display area 806 is typically provided in the form of a graphical network map with objects representing the network elements and the physical and/or logical links among the network elements. FIG. 9 illustrates an example of the display of a network topology, under an embodiment. For the network topology example 900 of FIG. 9, a typical home network is shown consisting of a home desktop 910, a home notebook 908, and peripheral devices such as a game machine 914, and USB device 912. Internet service is provided by an ISP 902, and the home devices are connected to this network through a modem 904 and internal (e.g., wireless) router 906. Each graphical device icon represents a data object that can be accessed to display specific information relating to the device, such as type, manufacturer, operating parameters, status, and other relevant information. Within the network, each device is coupled to at least one other device through a wired or wireless link

901. The link icons 901 also represent data objects that can be accessed to display specific information relating to the link, such as link type, status, and other relevant information. The topography display can be configured in any number of ways to display information related to each data object. For example, colors and/or shape icons can be displayed in conjunction with data objects to display status information. In an embodiment, colored dots are used with the link icons to indicate link status. For example, a red-dot on the link connection between the modem 904 and the router 906 may indicate a problem in this link, while a green dot indicates a functioning connection.

Each data object is a selectable object that provides an additional UI window displaying relevant information or providing for user input. For example, a user can select the router icon 906 and get specific router information. Clicking on the router icon itself will cause the display of a separate display page that shows detailed information about the router. In one embodiment the display area provides tabs to access other display windows for the UI. For example, one tab can provide a view to the devices in the network, and another tab can provide a view to the services in the network.

FIG. 10 illustrates an example web page for a device view of the home network management user interface, under an embodiment. This display provides a table 1000 that lists the network elements and associated information. Different classes of network elements can be defined, such as device, service, link, network, and so on. Each element can have an item name. The table also displays status information, status level, and any other information, such as date of deployment. In one embodiment, each table entry provides access to additional information relating to the entry, which can be displayed in the form of a pop-up or overlay window, or a link to a new window. As shown in FIG. 10, selecting a particular table entry indicating a problem (e.g., red link) causes the display of a supplemental display area 1002 that provides additional information, such as diagnostic information or possible solutions to the problem. The information provided in any such supplemental window can be provided by a service provider, the system itself, or any appropriate network entity.

The information provided in supplemental display area 1002 may provide instructions to the user indicating how a problem is to be solved, or it may provide links or access to utilities that solve the problem. For example, a service provider may instruct the user to reboot the router and provide instructions on how the router is rebooted. Once this step is performed, the UI includes a utility to update the network database and topology. This change can be reflected by display elements, such as turning a link or router from red to green, or some similar indicator. If any changes to the network or other devices are caused by the change, the network UI will be updated accordingly. In this manner, the system provides an updated context of the network at all times. The condition of each device and service relative to all other devices and services is tracked, updated, and available for display to any of the network entities, and especially to the service provider.

It should be noted that the UI display process may use any type of graphical indicator to denote the state or change of state or a network element, application, or other managed object. For example, icons can be displayed as green if operating normally, yellow if a warning condition exists, and red if there is a failure. The color noted in one or more of the web pages indicates this condition.

The network elements within the home network typically comprise devices, which are hardware elements, and services, which can be applications or attributes of the network. FIG. 11 illustrates an example web page for a services view of the home network management user interface, under an embodiment. As shown in window 1100, services can include operating systems, security settings or mechanisms, applications, sharing settings, quality-of-service (QoS) settings, and utilities. The table provides entries that indicate service name, service type, status, and diagnostic information. The service view provides a picture of all of the devices on the network. Services include things experienced by the customer. For example, the security service includes spy-ware, anti-virus software, and the like, as well as parental controls and privileges; and while back-up is a configuration issue plus software it too is facilitated as a service.

A principal aspect of the home network management system is the aggregation and provision of data from the home network to relevant entities, such as the service provider. In one embodiment, important incidences and messages are transmitted through an action item display area 808, of the UI of FIG. 8. FIG. 12 illustrates an example of an action item display area, under an embodiment. As shown in FIG. 12, the action item display area lists items in terms of attention level, as indicated by a color (e.g., green, yellow, red). The status of any particular item is then displayed along with any possible resolutions. In one embodiment, a service provider can run applications or utilities on specific devices facilitated by the service node, as part of the diagnostic or resolution process. This could be a service provider's own utility or one that is commercially available. For the example of FIG. 12, the possible resolutions include disk utilities provided by the service provider, or on site actions performed by a technician.

As shown in FIG. 1, the functionality provided by the service node can be accessed by a home computer 110, or a remote computer 140. This allows the service node to be embodied in a light weight device that is small, highly mobile, easy to install, and/or relatively inexpensive. This also helps to keep the UI on the service node screen fairly simple. Any detailed display or complicated interaction can take place on the user's computer 110 or 140. In certain circumstances, a user may initiate operation through the service node, but if transaction or display of information becomes too complicated, the user will be directed to use the main PC screen instead of the service node screen. For this embodiment, the client-side process 112 is the application on the PC that the user interacts with. This process interfaces directly with the service node and is a companion to both the service node, as well as system website. This interface can be configured to have a similar look and feel to the service node interface, but in general, it allows the user to see more complicated information (like a network topology map) and control more complicated product features, since computer displays are generally much larger than the display that may be provided in the service node.

FIG. 13 is an example of a client computer interface screen to the service node system, under an embodiment. The interface between the client computer and the service node is typically provided through a web interface. For the example web page 1300 of FIG. 13, the main display area is divided into a device information component 1302 showing a picture of any selected device and the detailed parameters associated with the device. The second area displays information regarding the home network and the customer 1304. In general, web page 1300 represents the top level of a hierarchically organized series of UI pages into the system as accessed through the client computer. Many other items of information and elements of user control can be provided through the main web page 1300 or any of the subsequent web pages.

The overall system of FIG. 1 enhances the proactive and reactive support paradigm for both service providers 114 and their customers because it creates a holistic end-to-end reference of the home network 102, connected devices 106 and their specific software applications. As a managed service, the home network management system ensures repeatability and efficient deployment since all devices and services are deployed by policies which are set by the service provider based on standards for network operation and device application interoperation.

Profile Index Process

In general, the home network system of FIG. 1 facilitates the management of digital households by providing both a communication channel and a policy execution engine. It is a distributed system composed of components within the user's home, such as the service node (box or customer premise equipment), agent software running on user computers or devices, the GUI running on the home computer, and offsite or back office (server) components, such as an automatic configuration server, operational support systems, and business support systems. The service node monitors the health of the local home network and its components, and communicates with the back office over secure Internet channels. The service node communicates with the agent software and other home devices over a wireless or wired home network. The GUI software is a stand-alone or browser based application that acts as a view into the managed home.

The service node subsystem executes processes that simplify management of the home network, monitors the health of administrative and operational aspects of the users, devices, applications, and policies within the home, executes security policies and integrity checks, and allows for remote process invocation including software updates and diagnostics. The back office subsystem acts as a repository for the digital home and executes processes that provide a provisioning mechanism for the service node; store, recommend and execute policies to automatically update the home, provide an interactive view of the managed home, and integrate with operational and business support systems.

During the course of managed home use, many different services and products may be provided to the user. Such products and services must often be installed, integrated, maintained, fixed and even uninstalled during their usable lifetime. This often necessitates a significant amount of communications and instructions from the vendor or service provider to the user, much of which may be automated. The home management system facilitates the provisioning of devices, applications and service platforms within the home. Although much communication may be routine, such as normal status checks or solicitations, critical communication often involves the resolution of issues. The type of communication required, however, varies greatly depending upon the user, the device being used, and the purpose of such usage. The home network management system includes a process that analyzes characteristics associated with different entities within the home, usage patterns for these entities, and then constructs a hierarchical index model that facilitates tailored communication for the various possible entity and usage classes.

In an embodiment, the home network management system includes a monitoring and learning system for automatic issue detection and alerting. This process monitors the activity of users and devices within the home, learns usage patterns, obtains certain external market data and then applies this learning back to the network management system to improve the digital performance of the home. This system leverages the data center in network, the service node and client-side processes in the home, and agent software resident in the intelligent devices in the home to connect a knowledge base that stores data regarding certain home entities. A hierarchical index model is used to assign intelligence levels to these entities based on certain parameters. The indices are then used to help direct alert messages, instructions, suggestions, and other targeted communications from the network manager or service providers.

A home, business, or location that is managed by a home network management system may be referred to as a "digital home," and generally comprises a number of different managed components. These can include the household itself, the users or people within the household, the devices (e.g., computers or appliances) used by these people, the applications or programs (e.g., software or firmware) running on these devices, and the community in which the household exists. Other entities can also be defined, depending upon particular applications and implementation environments. An optimally managed household is generally one in which each of the users is satisfied with their devices, applications, and level of support with regard to particular tasks and activities, and to the extent that their budget allows. Thus, although one might always want a better machine or tool to do something, a properly managed household would be one in which the resident devices and applications are appropriate and adequately supported for the task at hand, and a replacement or upgrade path is available if necessary or desired. Such a household can be described as one with a high or relatively high level of "digital performance," where the performance reflects the suitability and usefulness of each device, application, or program to perform their respective tasks. A home with a high digital performance would have devices and applications that are up-to-date, well-maintained and configured to perform their tasks, whereas a home with a low digital performance might have missing or improper devices to perform certain tasks, or have devices that are outdated or ill-maintained. In general, that "satisfaction" of a user with respect to a device reflects the degree to which he or she is happy with the current configuration and installation of the device for a particular use and given the available budget.

The entities of the managed digital home (household, users, devices, applications, and community) typically partake in different activities or tasks with regard to the managed components. For example, a user may interact with devices in the household primarily for productivity, (e.g., a professional in a home office) or for entertainment (e.g., a student in a home). Similarly, a particular device may be used for different purposes, such as a personal computer, which can be used for entertainment or for productivity. In one model of a managed digital home the entities of the household are divided into the following usage classes: networking, productivity, and entertainment. These usage classes indicate the primary use or task associated with an entity within the managed home. The household itself is a collection of devices and users, and may have different usage classes, depending upon the predominate function of the devices and/or users within the household.

In one embodiment, an index is applied to the entities and classes within the home to provide a metric or measure of the digital performance of the managed home. This index may be referred to as a "profile index" and serves to identify and track environment topologies, configurations, application installations, usage, and support details for the home. The index data can then be used to enable service providers to provide optimum service with minimal user input, or to enable automatic processes to monitor and react to service problems, as well as enable retailers or providers to identify and target sales opportunities within the home. The index data can also be used in a predictive manner to indicate the next likely step in the hierarchy for an entity to help anticipate services or products that might be needed. The profile index consists of a numeric value associated with each user type and class. FIG. 14 is a table that lists profile indices for user types and classes within a managed digital home, under an embodiment. As shown in table 1400 of FIG. 14, there are five different entities 1402 in the managed home: the household, the users, the devices, the applications, and the community. Other or different entities may also be defined, depending upon the network environment. Each entity is divided into a usage class 1404. These are networking, productivity, and entertainment. Other or different classes may also be defined, depending upon the network environment. Each class for each user is assigned a numeric index value 1406. For the embodiment shown in FIG. 14, the index value ranges from 1 to 8, although practically any range of values can be used. The index value represents the relative level of satisfaction associated with an entity with regard to a particular usage class, and a higher value denotes a higher level of satisfaction.

Many different user profiles exist with varying network, productivity, and entertainment levels. For example, a user who downloads graphics and images frequently may rank high on network usage but not use it very much for either productivity or entertainment; a self-employed person may rank high on only productivity, investing more time in productivity devices and applications than the network itself; while audiophiles and garners may rank very high on entertainment (and probably network) but low on productivity. There are similar differentiations within household, device, and application entities. There can be any number of permutations of the profile index, even within the each of the five entities (e.g., up to 512). In some cases, there will be clustering of certain index values, and, in fact, it is likely this clustering that will yield some of the most important insights into the entity profiles.

In an embodiment, the profile index scheme utilizes a psychological needs model to map a relative numeric value to a particular psychological state. One example model is the Maslow index system, which is based on Abraham Maslow's hierarchy of eight psychological needs. The Maslow model organizes psychological needs in an eight-level hierarchy that ranges from physical, safety, social, esteem, cognitive, aesthetic, self-actualization, and transcendence. The profile index scheme maps these needs onto configuration and usage data within a managed digital home to generate an index for each entity and usage class combination.

The managed digital home includes a primary network hub (service node) and all digital devices within that network that are managed by agent processes. As shown in FIG. 14, the profile index is segmented into three denoted usage class levels of: networking (connectivity), productivity (communication/data/application), and entertainment (media/gaming). Within each of these three levels, the index uses configuration and installation data to assess the entry profile for the managed household, each user within that household, each device on that digital home network and each application on that device, as well as the overall community. This assessment can then be used to determine the most efficient and effective consumer experience, support level, and advice regarding topology, configuration, policy, products, and services.

In one embodiment, the Maslow hierarchy is applied to each of the user classes of networking, productivity, and entertainment for generation of the profile index of the managed home. FIG. 15A illustrates the mapping of Maslow's hierarchy levels to home networking needs, FIG. 15B illustrates the mapping of Maslow's hierarchy levels to digital productivity needs, and FIG. 15C illustrates the mapping of Maslow's hierarchy levels to digital entertainment needs. In each of the tables of FIGS. 15A, 15B, and 15C, the general Maslow levels of survival (as represented by basic physical needs and safety/security needs), social (as represented by social needs, esteem needs, and cognitive needs), and self actualization (as represented by aesthetic, self-fulfillment and transcendence) are mapped to particular characteristics associated with the networking, productivity, or entertainment class.

For the digital home networking needs shown in FIG. 15A, the survival needs comprising physical and safety aspects indicate whether the basic infrastructure (e.g., connections and cabling) are provided and reliable with respect to consistent connectivity and robustness against security breaches. The social needs of the network comprise social, esteem and cognitive aspects that indicate whether the network meets communication needs within and outside of the home, and provide control over the network, as well as allows for data integration, such as through media transfers among network devices and among different device types. The self-actualization needs of the network comprise certain aesthetic, self-actualization and transcendence aspects of the network that indicate whether the network facilitates integration of different functional environments of the digital devices (e.g., entertainment, computing and gaming), as well as the integration of different media types toward the total digital integration of the home, and finally the implementation of smart home concepts that integrate appliances and electronics within the home.

For the digital home productivity needs shown in FIG. 15B, the survival needs comprising physical and safety aspects indicate whether the basic infrastructure of devices and applications are available and properly installed, and that the devices and applications are understood and able to be used. The social needs of the productivity system comprise social, esteem and cognitive aspects that indicate whether the productivity components facilitate sharing of data among entities (people, devices) within the home, provide a feeling of control over the devices and applications, and enable learning and analysis of data within the home. The self-actualization needs of the productivity devices and applications comprise certain aesthetic, self-actualization and transcendence aspects that indicate whether the user has mastery over the aesthetics of the productivity environment, is able to use the productivity environment for aspirational objectives, and finally, whether the user is able to influence others with respect to productivity skills.

For the digital home entertainment needs shown in FIG. 15C, the survival needs comprising physical and safety aspects indicate whether the basic infrastructure of devices and applications are available and properly installed, and that the devices and applications are understood and able to be used. The social needs of the digital entertainment system comprise social, esteem and cognitive aspects that indicate whether the productivity components facilitate sharing of entertainment resources among entities (people, devices) within the home, provide a feeling of control over the entertainment devices and applications, and encourage learning and analysis of entertainment resources. The self-actualization needs of the entertainment devices and applications comprise certain aesthetic, self-actualization and transcendence aspects that indicate whether the user has mastery over the aesthetics of the entertainment environment, is able to use the entertainment environment for aspirational objectives, and finally, whether the user is able to influence others with respect to entertainment skills.

The networking, productivity, and entertainment needs for the various entities of the home, the household, users, devices, applications, and community are analyzed to generate an array of indices that indicate the profile and level of performance or satisfaction of the digital home over a wide range of factors. The overall index matrix is illustrated in FIG. 14, and is generated by an index generator process 128 in the data center 120 of the system shown in FIG. 1. The index generator process 128 is a dynamic process that analyses the home and generates an initial index matrix based on an initial assessment, and then continually updates the indices based on various factors related to usage of devices and applications, modifications to the network and home, changes of users, behavioral trends, market forces, and any other relevant factors.

Figure 16:
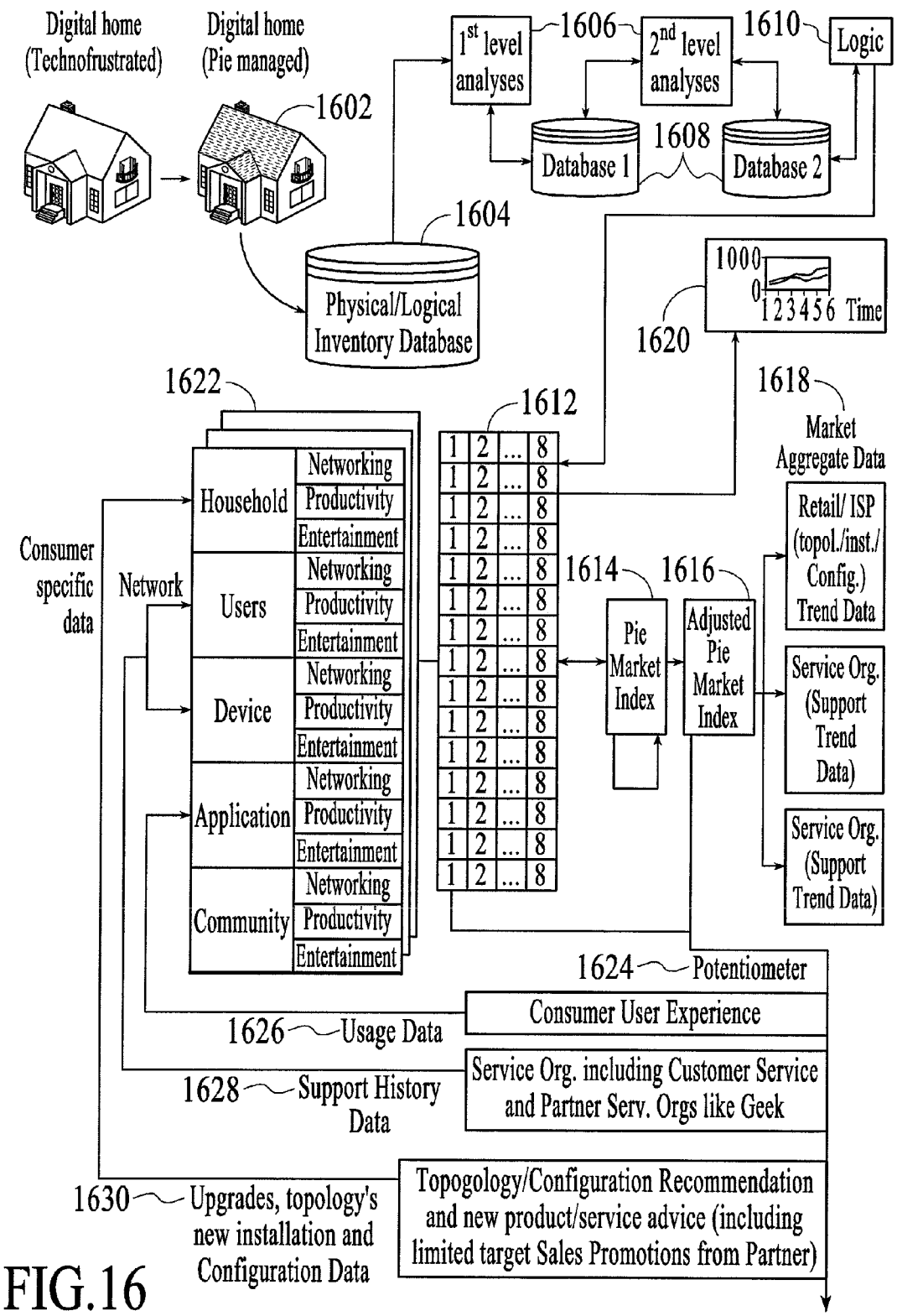
FIG. 16 is a process flow diagram that illustrates the creation and development of a profile index matrix by the index generator process, under an embodiment.
Figure 17:
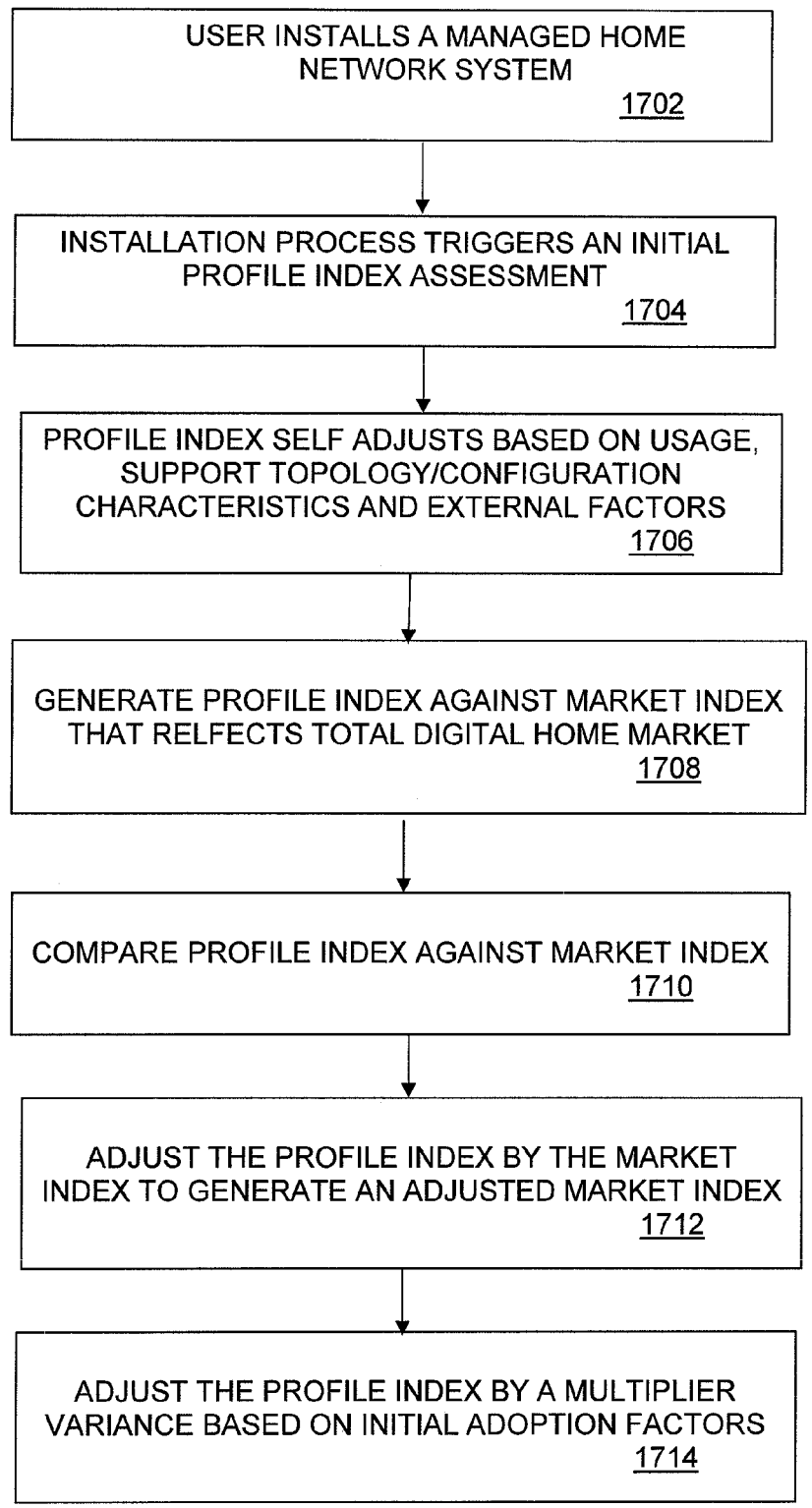
FIG. 17 is a flowchart illustrating the steps of building and modifying the indices of the profile index matrix, under an embodiment.

FIG. 16 is a process flow diagram that illustrates the creation and development of a profile index matrix by the index generator process, under an embodiment. The steps of building and modifying the indices of the profile index matrix are illustrated in the flowchart of FIG. 17. The digital home 1602 is one that has a managed home network system installed, block 1702. The home 1602 has associated with it an inventory database 1604 that stores all of the relevant data associated with the entities within the home, such as user profiles (gender, age, role, hobbies, relationships, occupations, social network background, etc.), device data (e.g., type, make, model, age, etc.), application information (e.g., platform, name, revision, etc.), and other similar data. This data is processed through one or more analysis processes 1606 to generate one or more intermediate databases or data sets 1608. This data is then processed by logic component 1610 to generate the indices 1612 that are associated with each of the entities and classes 1622, which results in a profile index matrix, such as shown in FIG. 14.

As shown in FIG. 17, the installation process, or a similar initialization process for a new home 1602 or a new system installation triggers an initial profile index assessment, block 1704. This initial assessment is performed through a query of the entities of the household through automatic means, such as a scan of devices and downloads of data, as well as manual means, such as direct user input, and the processing of this data through the analysis 1606 and logic 1608 processes. This initial assessment step generates a first instance of profile index matrix 1612. The initial assessment step may be performed by isolating the different entities within the home. In general, isolating the household, devices, and applications is relatively straight-forward, while isolating the user and community entities may require reconstructive analysis of log-in, device and application usage.

The profile index matrix then self adjusts and updates the various indices based on several factors, such as usage, network modifications, device and application modifications, changes of or in users, changes of environment or community, market conditions, and other relevant internal or external factors, block 1706. The internal changes within the household typically result in a relatively straightforward update in the profile index matrix. As users become more familiar and comfortable with devices and applications, their index value may increase accordingly along the index hierarchy depending upon the usage class—networking, productivity, or entertainment. Similarly, if a new user or device is introduced into the home, its index may start at a low value and then increase as it is more fully accepted and integrated into the household. The topology and configuration of the network is also a characteristic that is often subject to change as devices are added/deleted, applications are loaded/deleted, and device configurations are changed. One important component of the internal factors includes the maintenance and support history of devices and applications, such as patches and upgrades to applications and firmware/software.

The index values are generally integer values or any other values that indicate relative ranking along a defined scale. In one embodiment, an array or matrix of various index values is created and stored for each usage class for each entity. Alternatively, the integer values may be processed to generate a single index value for the entire home. Such an overall index value may be calculated by taking the average or mean of all index values, or a weighted average, or any similar calculation. In a further alternative embodiment, the entire index matrix may be reduced to only a few indices, such as a single index value per usage class, or entity. The single or reduced index matrix can then be used to facilitate the provision of services or the transmission of communication from third parties on the basis of generalized characteristics rather than specific usage classes for each entity.

The update interval for the self-adjustment mechanism is defined by the system and can be set to any time period that is appropriate for the system. A different update time period may be selected for different entities and/or different usage classes.

A significant source of external factors that impact the profile index matrix is the market or commercial environment for digital devices. Market trends often drive conditions of satisfaction and utility with respect to usage of digital devices, especially in this increasingly technology-driven age. New devices, platforms, applications, and media formats are constantly being introduced, and replacement or upgrades often become desirable, if not downright necessary for continued use and enjoyment of certain home functions. The recent nation-wide upgrade to digital television is a salient example of this situation. As shown in FIG. 16, the profile index generation process includes one or more processes that account for market affects. In an embodiment, an overall market profile index 1614 is generated for the digital market that encompasses a defined environment, as shown in block 1708 of FIG. 17. This can be the entire market of digital homes, or the specific market of particular user types, devices, or applications, and so on. The profile index 1612 is then compared to the market index, block 1710. This comparison operation is used to adjust the profile index to generate an adjusted market index 1616, block 1712. Various items of data, referred to as market aggregate data 1618 can be used to create the market index and adjust the profile index. These include retail or service provider trend data that reflect device and application sales and forecasts, service organization support data that reflect installation and support issues, and other similar market data.

As shown in FIG. 16, the profile index 1612 and the adjusted market index are used to continually adjust the indices associated with the entities and usage classes 1622. The user experiences generate usage data 1626 can be used to update the indices associated with the application and device classes. The service organization data from customer service or professional installation providers generates support history data 1628 that can be used to update the indices associated with the user, device, and application classes. Similarly, recommendations regarding topologies and configurations generate topology/configuration data 1630 that can be used to update the household and community indices. These index upgrade processes illustrated in FIG. 16 are intended as examples, and many other data sets and upgrade paths are possible, depending on home and network installation environments.

In one embodiment the initial adoption of managed home networks can have an effect on subsequent home networks, and this affect may also be reflected as a source of adjustment of the profile indices. For the embodiment of FIG. 16, a potentiometer function 1624 is provided that accounts for the fact that increased adoption of a managed home network may outpace the general market. An initially installed base of managed homes may skew the market data, and the potentiometer function 1624 can be used to reduce the effect of such managed homes relative to the rest of the market. As the number of managed homes in an environment or community increases, the potentiometer offset may be less necessary. This adjustment to the profile index is reflected in block 1714 of FIG. 17.

Figure 18:
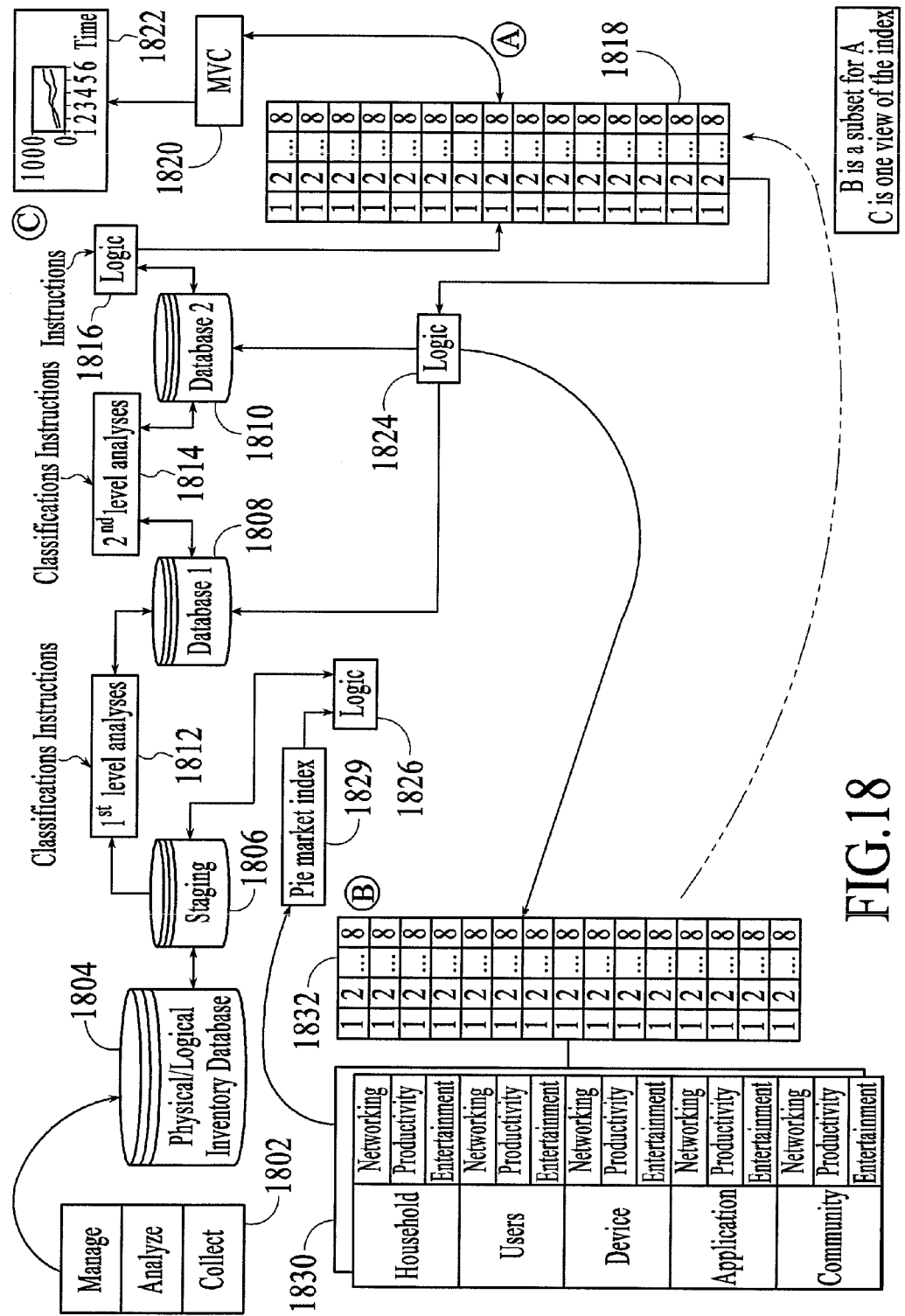
FIG. 18 is a flow diagram illustrating the creation of a profile index through logic/analysis components and data base structures, under an embodiment.

For the embodiment illustrated in FIG. 16, in an initial assessment process, a first array of indices is produced. The monitoring and index generation process on the server computer continuously reassess the profile index matrix and factors in usage and support data, as well as external market data, and uses this evolutionary knowledge to more-accurately target consumer experience, required support, as well as predict additional product and service needs within the managed digital home. Initial system data may be generated through market research or similar information gathering techniques that compile statistical data from industry sources to build out a profile index of standard normative parameter values. After the initial matrix is built, a collection of unique data collection and benchmarking methods are used to continually measure against this standard or defined matrix to determine the evolving profile index for every managed digital home. The system includes a set of analysis and logic components that compile and sort various data items to create the profile index. FIG. 18 is a flow diagram illustrating the creation of a profile index through logic/analysis components and data base structures, under an embodiment. The flow diagram of FIG. 18 provides a more detailed view of the analysis 1606, logic 1610 and database structures 1608 of FIG. 16. The profile index 1830 of system 1800 and 1832 consists of five entities (household, user, device, appliance, community), each consisting of three separate usage classes for network, productivity, and entertainment. The hierarchy of networking, productivity, and entertainment topology and usage is assessed based on various parameters, such as, topology, installation, configuration, usage, and support history.

As shown in FIG. 18, a management/analysis/collection component 1802 compiles data to populate a household inventory database 1804. Initial data can be generated through an installation process that triggers initial assessment, as described earlier with respect to FIG. 17. The inventory database 1804 stores information related to the physical and logical assets in the home network. This data can include device or user names, IP addresses, node identifiers, make, model, device, patch, network topography, and other relevant items of information. For the embodiment of FIG. 18, the inventory database 1804 is accessed through a query process to create a staging database 1806 that is a subset of inventory database 1804.

In block 1812, data is extracted from the staging database 1806, and a first level analysis process 1812 comprising certain logic functions is executed on the data based on parameters and satisfaction criteria embodied within classification instructions. The first level analysis process 1812 executes one or more functions denoted $f(\ldots)$, where the parameters of the functions include logic related to various aspects of the network and/or devices such as topology, security, reliability, usage, network traffic, and the like. This data may represented by any number of relevant data items, such packet traffic, login/logout information, number of interruptions, failures, number of trouble tickets open, and so on. The output of the first level analysis component 1812 is input to a data store denoted database 1, 1808.

In an initial deployment, the first level analysis process 1812 typically determines the topology of the network. In this case, the arguments of the function $f(\ldots)$ comprise parameters related to the topography of the network such as network node numbers, device IDs, path identifiers, routing information, and so on.

As shown in FIG. 18, the data from the first level analysis component 1812 is run through a second level analysis component 1814, which comprises classification instructions for different parameters (e.g., usage, support, satisfaction, etc.) to generate a second database, denoted database 2, 1810. The second level analysis process executes one or more functions denoted $f'(\ldots)$. In an initial deployment, the second level analysis process 1812 typically determines the usage of the network. In this case, the arguments of the function $f'(\ldots)$ comprise parameters related to the usage of the network devices such as on/off time, bandwidth utilization, idle time, and so on.

The resulting data from this analysis component is then processed through logic component 1816, which contains instructions that organize the data in a hierarchy of indices 1818 for entities and usage classes 1830 in the home network. Thus, data matrix 1818 is a superset of the profile index matrix 1832 for the home network. In one embodiment, the matrix data 1818 comprises an index value for each entity and usage class 1830. This data is processed through a series of comparison and data mining processes to self-adjust as the household evolves in time and through external factors to generate the profile index matrix 1832. Internal evolution includes usage patterns and internal device and user changes, while external data includes changes in the overall digital marketplace (e.g., new technology, media, devices, etc.) or conditions (e.g., viruses, security alerts, etc.).

As shown in FIG. 18, the matrix data 1818 is input to logic process 1824 that populates both the first and second databases 1808 and 1810. Logic process 1824 includes rules and instructions that account for internal usage and behavior trends to modify the data. This logic process 1824 also creates an instance of the profile matrix 1832.

The external data is generated through a market index process 1829, which compiles market and industry data relevant to the entities and usage classes 1830. The output of the market index process 1829 is processed through logic component 1826 to populate or modify the data stored in staging database 1826. Thus staging database 1806 includes data from the household inventory database 1804, which has been modified to reflect the external factors. Information regarding the household is stored in a central inventory database, and the system continuously monitors the household to modify the data. This data is analyzed, indexed, and then plugged into a hierarchical model to represent various characteristics of the network such as satisfaction, performance, and productivity levels. The hierarchical structure is basically a psychological mapping that reflects satisfaction along a continuum of psychological needs. The levels progress from security to social, and then to esteem based on a knowledge base analysis. This index hierarchy is used to modify how a party communicates with the network, and allows vendors or service providers to match promotions messages to actual usage within the network.

The market index process 1829 and logic components 1824 and 1826 provide a feedback loop within the system that modifies the index matrix based on usage, topography, and external factors. In an embodiment, the matrix data 1818 is organized in a hierarchical value structure according to the Maslow model, or similar scheme to help direct alerts and resolutions, or other transmissions to the network. For the embodiment of FIG. 18, the matrix data 1818 is processed through a multi-variable calculus (MVC) process 1820 to generate one or more reports 1822 that may display various characteristics (e.g., usage, satisfaction, problems, threats, etc) over time.

In general, the indices are used to direct alert messages, instructions, or take an action, such as retrieve a product or install a service). The index model represents an implementation of a targeted facility for providing communications from a network manager or service providers. The index model can provide a prediction of what a user or household may need, and thus facilitate proactive support and provision of products and services. Such a prediction may be provided by the trend of movement along the index hierarchy, and the needs of users in similarly hierarchical rankings. For example, as a user moves towards a higher ranking (e.g., aesthetic), the system may provide a mechanism to pre-fetch drivers or software used by other users in that rank, and make them available to the user immediately upon the user attaining that ranking.

As shown in FIG. 18, in an embodiment, the overall analysis process comprises first and second level analysis components 1812 and 1814 that work in conjunction with certain logic components. The analysis components 1812 and 1814 determine certain characteristics or parameters associated with the network and the individual elements within the network, such as devices, paths, and users. In an example of analysis functionality, a first level of analysis performed by analysis component 1812 could be to determine the overall network topology, that is, to determine what hardware and software the consumer has in the house. This information is then used to determine whether the house leans more toward productivity, entertainment, or networking. For example, a household with four computers but no gaming devices and only one router would likely be identified as a productivity household. Likewise, a household with a sophisticated network infrastructure with multiple access points and an NAS (network-attached storage) device would likely be identified as leaning toward a networking household, just as a house with two gaming systems and a networked music system but without sophisticated networking infrastructure would likely be identified as entertainment.

Once the topology has been determined and characterized, the second level analysis component 1814 identifies additional information regarding the network. In an embodiment, this level of analysis can determine the usage of the network devices. For example, if it is determined that the house has only one gaming system but that gaming system uses majority of the network resources (bandwidth), the system would decide that even if the household itself looked like a productivity household, the actual usage was skewing it toward an entertainment household. This identification could then yield recommendations to determine what the homeowner's true desire was with regard to network use. If the homeowner did want to use his home network primarily for productivity but had a member who was a gamer, there could be a recommendation of ways to limit gaming usage during times when productivity was important. Likewise, if the household was truly evolving to more of an entertainment household, there may be recommendations of other related home network gaming devices or providing advance notice for the new devices (e.g., network televisions) that might be made available.

Another example of second level analysis would be support issues. For example, if the home is primarily a productivity home and the consumer has many support issues for an old printer that needs upgrading, here could be a recommendation for a more effective printer or even a more cost efficient printer where the consumer would spend less money on ink cartridges. This recommendation would be drawn from printer usage information.

In one embodiment, the analysis components and processing logic comprise certain software routines or algorithms that are dynamic and evolve with industry data, usage data, and other relevant factors. For example, when networked televisions are available on the market, their adoption will shift "entertainment" households (i.e., households that are set more for individual entertainment experiences) to a "network" household (i.e., households that rely on a functioning network to realize the full extent of their entertainment systems. An example of this is a household that stores images on a network-attached storage device or households that have moved to networked music systems (e.g., wireless multi-room music systems). Support data will also influence these algorithms. For example, as the established based of managed home networks expands, there will be an ever-growing body of analytic data available regarding support challenges of various types of households. Over time data regarding best practices regarding how to support these challenges will also be developed. The analysis and logic algorithms will evolve with this data, as well. The analysis and logic algorithms will thus be programmed with initial rule sets and default data models to cover initial topography conditions and usage patterns, but are adaptive so that they evolve based on accumulated market, household, and installed base data, as well as other relevant data.

The categorization of entities along the five defined types (household, user, device, application, and community) and the breakdown of each of these entities into usage classes (network, productivity, entertainment) provides a comprehensive map of the overall digital home. The assigning of index values to each of these items along a hierarchical model reflecting psychological needs then provides an effective mechanism to generate and route targeted communication. For example, there may be four printers within a house, some of which may be used just to print photos taken from a digital camera. The usage class of this printer will then differ from that of other printers, as it may represent a device geared more for entertainment versus productivity, for example. This may lead to different recommendations depending on the index value of this printer, as applied to the usage varies over the course of its life in the home. The hierarchical ranking of index values within the Maslow model provides a mechanism whereby issues and satisfactions can be tracked and stored. For example, as use of a device becomes more prevalent, the index may move up the hierarchy from basic needs to cognitive needs, in which case, the alerts or targeted communications may change from basic setup information to more esoteric usage information (e.g., invitation to user groups, forums, wikis, and so on). If an external threat to a particular device is present (e.g., malware, virus, etc.), the index value may shift relative to an initial index (e.g., a drop down to safety from esteem), which may prompt a new or different type of communication (e.g., warning, anti-virus patch, etc.).

The profile index system described above catalyzes a user to evolve with the digital home, and further facilitates support from partner service organizations by providing partner retail channels and service providers (e.g., ISP) with target sales opportunities based on the user needs. The generalized aggregate data from the index matrix has value as predictive digital home market data for retail and ISP channels, service organizations, product manufacturers, and application developers. It also helps maximize a user's satisfaction with the home networking environment by providing accurate usage and maintenance data to streamline the delivery of upgrades, patches, fixes, and support information for all of the smart devices within the home.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A computer-implemented method of automatically detecting issues and facilitating the transmission of alert messages in a home network consisting of a plurality of consumer electronic devices coupled to a service node, the method comprising:
storing, in a computing device, information regarding home entities in an inventory database, the entities comprising the household, one or more users within the household, devices in the household, applications running on the devices, and a community of which the household is included;
defining usage classes for each entity, the usage classes denoting a primary function associated with the home entity, and comprising networking, productivity, and entertainment;
assigning, by operation of a processor on the computing device, an index value to each usage class for each entity, the index value comprising an integer value within a fixed range, and reflecting a relative level of satisfaction associated with the entity for each respective usage class;
monitoring, by operation of the processor on the computing device, data regarding usage trends, performance characteristics, and external variables associated with the home entities;
modifying one or more of the index values based on the monitored data; and
facilitating the transmission of messages sent from a computing device regarding services or products related to the home entities from one or more parties, wherein the messages are conformed to the index values.

2. The method of claim 1 wherein the index values are arranged as a hierarchal index model, and wherein the hierarchical index model comprises a psychological needs model.

3. The method of claim 2 wherein the psychological needs model comprises the Maslow hierarchical model.

4. The method of claim 1 wherein the external variables comprise market conditions associated with a respective entity.

5. The method of claim 1 wherein the parties are selected from the group consisting of: a network administrator, a manufacturer or provider of one or more of the products or services, a retailer of one or more of the products or services, and an independent service provider associated with one or more of the products or services.

6. The method of claim 1 wherein the messages comprise targeted solicitations regarding replacement or upgraded products or services.

7. The method of claim 1 wherein the messages comprise one of: instructions, bug fixes, diagnostic information, or alert messages for one or more of the products and services.

8. The method of claim 2 wherein the household comprises a network of electronic devices compatible with a defined communication protocol, the method comprising:

executing a discovery routine to discover compatible devices of the plurality of devices in the network;

performing a search of devices in a database stored in a data center for devices in the network that are not compatible;

loading an agent process into each device of the discovered compatible devices for local execution on the respective device, the agent process communicating with the service to provide operational data relating to the respective device, and wherein the agent provides fail-over for critical communication and service systems of the service node and proxy communication to a data center;

storing device parameters of discovered compatible devices in a registry; and determining logical and physical interconnections among the plurality of devices in the network; and generating a network topography comprising the registry data and the logical and physical interconnection data.

9. The method of claim 8 wherein each device of the plurality of devices is coupled to the service node through one of a wired link or a wireless link, and wherein the compatible devices conform to one of the Universal Plug and Play (UPnP) protocol, UDP, TCP-IP, Zero-conf, HTTP, or HTTPS.

10. The method of claim 9 wherein the agent process is configured to interact with a control process executed on the service node to allow management of the respective device by the service node, wherein management includes monitoring the respective device, detecting problems, performing device troubleshooting, removing the respective device, and updating the respective device.

11. The method of claim 10 further comprising interfacing with at least one service provider, the interface providing the network topology to facilitate servicing of a device based on the network context of the device and the index values of the profile index matrix.

12. The method of claim 11 further comprising interfacing the service node to the data center over a network, the data center including at least one server executing an automatic configuration process for provisioning and maintaining the service node, and an operational support software process for maintaining programs executed by the plurality of devices, the data center further comprising a data store configured to store operational data related to the plurality of devices.

13. An apparatus for facilitating management of a home network including consumer devices, comprising:

a service node, having at least a processor and a memory, and including one or more communication links to a plurality of devices deployed in a home environment, wherein each of the plurality of devices executes a respective agent process that provides configuration information regarding the device to the service node, and wherein the configuration information is stored in a device registry;

a computer server having a processor and a memory coupled to configured to communicate over a network with the service node and configured to store device parameter information in the device registry, and to generate a network topology representing operational characteristics of the devices and interconnection information among the devices; and an index generation process configured to define one or more entities within the home network and one or more usage classes for each entity, extract data from the network corresponding to usage characteristics, and operational issues associated with the entities, assign an index value to each usage class for each entity based on the extracted data to generate a profile index matrix, obtain market data for at least one of the one or more entities, and modify the index value for the at least one entity based on the market data.

14. The apparatus of claim 13 wherein the index value is an integer value representing a relative level of satisfaction of an entity with a respective usage class.

15. The apparatus of claim 14 wherein the index matrix implements a hierarchical index model comprising a psychological needs model.

16. The apparatus of claim 13 wherein the entities are selected from the group consisting of household, users within the household, devices operated by the users, applications loaded onto the devices, and a community in which the household is located.

17. The apparatus of claim 16 wherein the usage classes represent a functionality associated with each entity of the one or more entities and comprise networking, productivity, and entertainment.

18. The apparatus of claim 13 further comprising an interface to one or more service providers providing device support information, the interface providing the network topology to facilitate servicing of a device based on the network context of the device and the index matrix, wherein the method further comprises facilitating the transmission of messages regarding services or products related to the entities of the home from one or more service providers, wherein the messages are conformed to index values.

19. The apparatus of claim 18 wherein the messages are selected from the group consisting of: targeted solicitations regarding replacement or upgraded products or services, instructions, bug fixes, diagnostic information, and alert messages for one or more of the products and services.

20. The apparatus of claim 13 wherein at least a portion of the plurality of devices is coupled to the service node through one of a wired connection or a wireless connection, and wherein the interconnection information comprises at least one of physical interconnection information and logical interconnection information.

21. The apparatus of claim 13 wherein each device of the plurality of devices is an active device that is capable of storing and executing software program, and wherein each of the plurality of devices is a consumer electronic device.

22. The apparatus of claim 21 wherein the data center includes at least one server executing an automatic configuration process for provisioning and maintaining the service node, and an operational support software process for maintaining programs executed by the plurality of devices, the data center further comprising a data store configured to store operational data related to the plurality of devices and the network topology.

23. The apparatus of claim 22 wherein the management tasks include discovering devices in the network, adding new devices to the network, removing devices from the network, and monitoring the plurality of devices in the network.

\* \* \* \* \*